United States Patent
Tsuchiya

(10) Patent No.: US 7,468,994 B2
(45) Date of Patent: Dec. 23, 2008

(54) METHOD AND APPARATUS FOR INTERLEAVE PROCESSING, AND COMPUTER PROGRAM PRODUCT FOR INTERLEAVE PROCESSING

(75) Inventor: Kazuhisa Tsuchiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 1430 days.

(21) Appl. No.: 10/373,435

(22) Filed: Feb. 25, 2003

(65) Prior Publication Data
US 2003/0182524 A1 Sep. 25, 2003

(30) Foreign Application Priority Data
Feb. 27, 2002 (JP) ............... 2002-052023

(51) Int. Cl.
H04J 3/02 (2006.01)
H04N 7/26 (2006.01)
G06F 13/00 (2006.01)

(52) U.S. Cl. ............... 370/539; 370/541; 386/112; 711/157

(58) Field of Classification Search ............... 370/252, 370/254, 537, 539, 541; 711/157; 714/755; 386/112
See application file for complete search history.

(56) References Cited

U.S. PATENT DOCUMENTS

| 5,565,924 | A | * | 10/1996 | Haskell et al. | 348/423.1 |
| 5,629,736 | A | * | 5/1997 | Haskell et al. | 348/386.1 |
| 5,818,547 | A | * | 10/1998 | Ozaki | 348/425.4 |
| 5,982,459 | A | * | 11/1999 | Fandrianto et al. | 348/425.3 |
| 5,991,857 | A | * | 11/1999 | Koetje et al. | 711/157 |
| 6,072,771 | A | * | 6/2000 | Anderson et al. | 370/216 |
| 6,483,543 | B1 | * | 11/2002 | Zhang et al. | 348/390.1 |
| 6,504,576 | B2 | * | 1/2003 | Kato | 348/423.1 |
| 6,704,281 | B1 | * | 3/2004 | Hourunranta et al. | 370/230 |
| 6,711,182 | B1 | * | 3/2004 | Gibbs et al. | 370/537 |
| 6,826,202 | B2 | * | 11/2004 | Takashimizu et al. | 370/535 |
| 2002/0083279 | A1 | * | 6/2002 | Shahrier | 711/157 |

* cited by examiner

Primary Examiner—Hong Sol Cho
(74) Attorney, Agent, or Firm—Frommer Lawrence & Haug LLP; William S. Frommer; Thomas F. Presson

(57) ABSTRACT

An apparatus defines interleave-processing segments to be interleaved in a backward direction relative to a flow direction of bit streams. The segments are defined every time the segments, ILVU-BR, -CR, -DR are successfully set for each of the respective bit streams, VOB-B-VOB-D. In setting the segments for each of the respective bit streams, the segment of one bit stream is set to follow the set segment of other bit stream. When an amount of data of the rest of the bit streams is insufficient to form the final segment, the rest data is distributed among the segments that have been already defined. The defined segments are arranged in the flow direction of the bit streams.

9 Claims, 18 Drawing Sheets

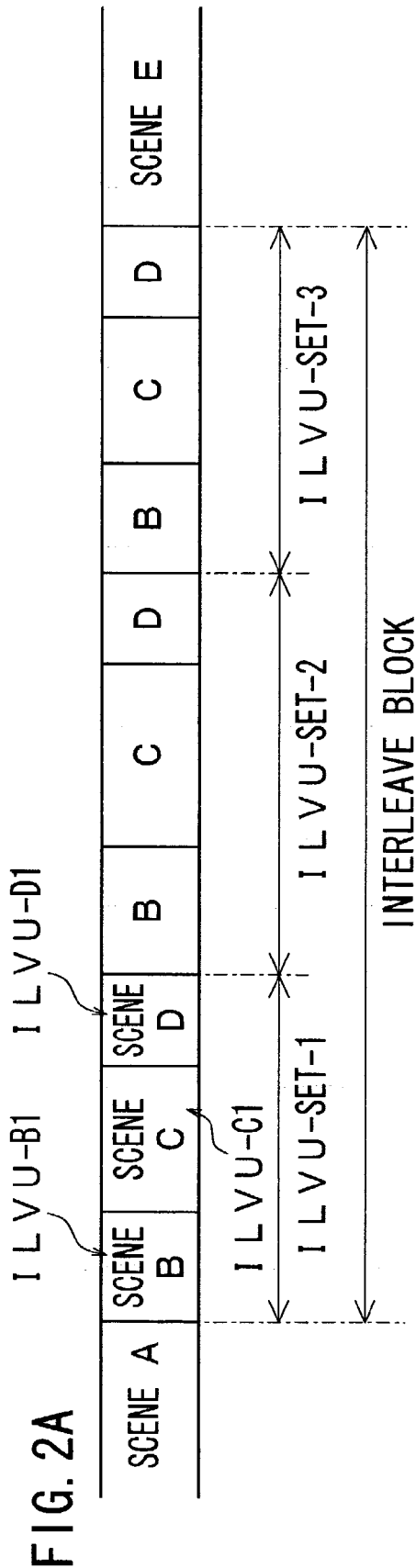
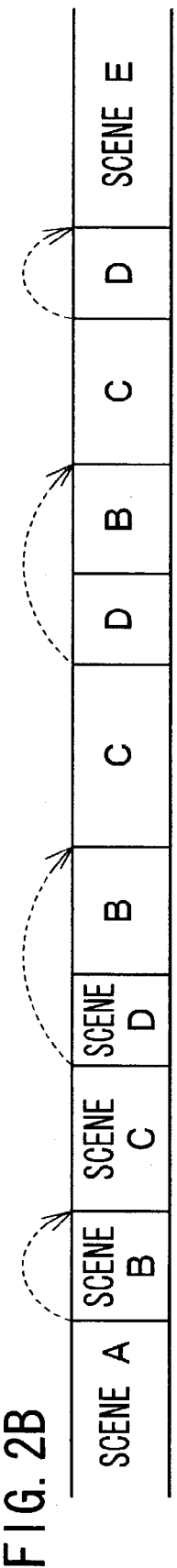

FIG. 6

VOB-A

{VOB-B, VOB-C, VOB-D}

VOB-E

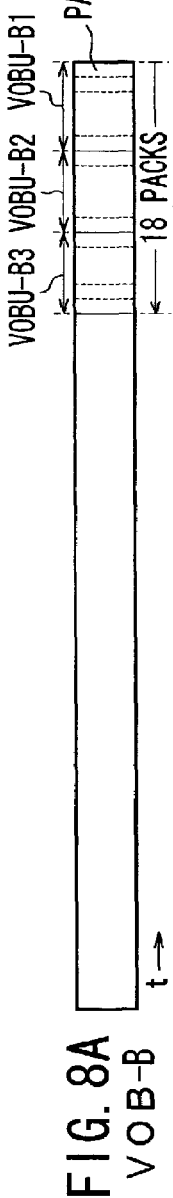
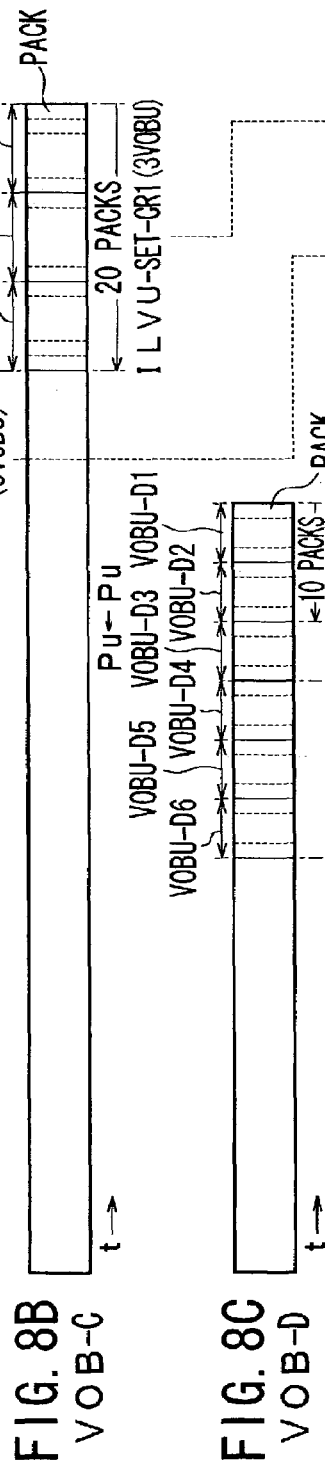
FIG. 8A VOB-B
FIG. 8B VOB-C
FIG. 8C VOB-D
FIG. 8D

FIG. 13

| SECTOR | VOB | NUMBER OF PACKS |
|--------|-----|-----------------|
| 0 | A | 1000 |
| 1000 | B | 10 |
| 1010 | C | 10 |
| 1020 | D | 10 |
| 1030 | B | 20 |
| ⋮ | ⋮ | ⋮ |

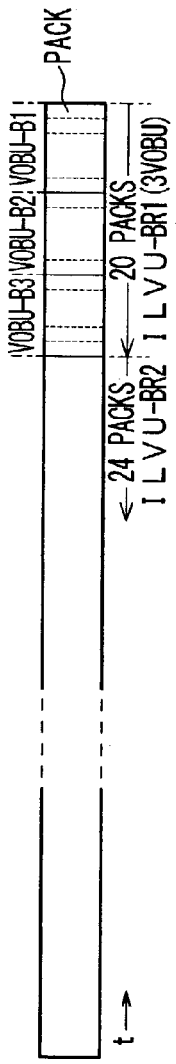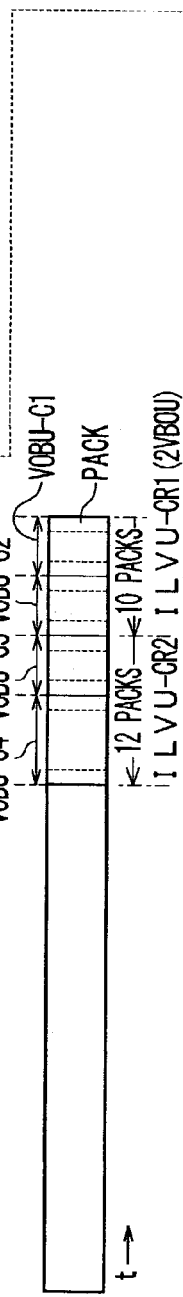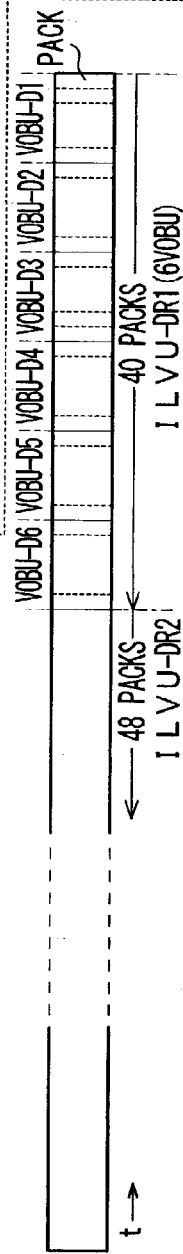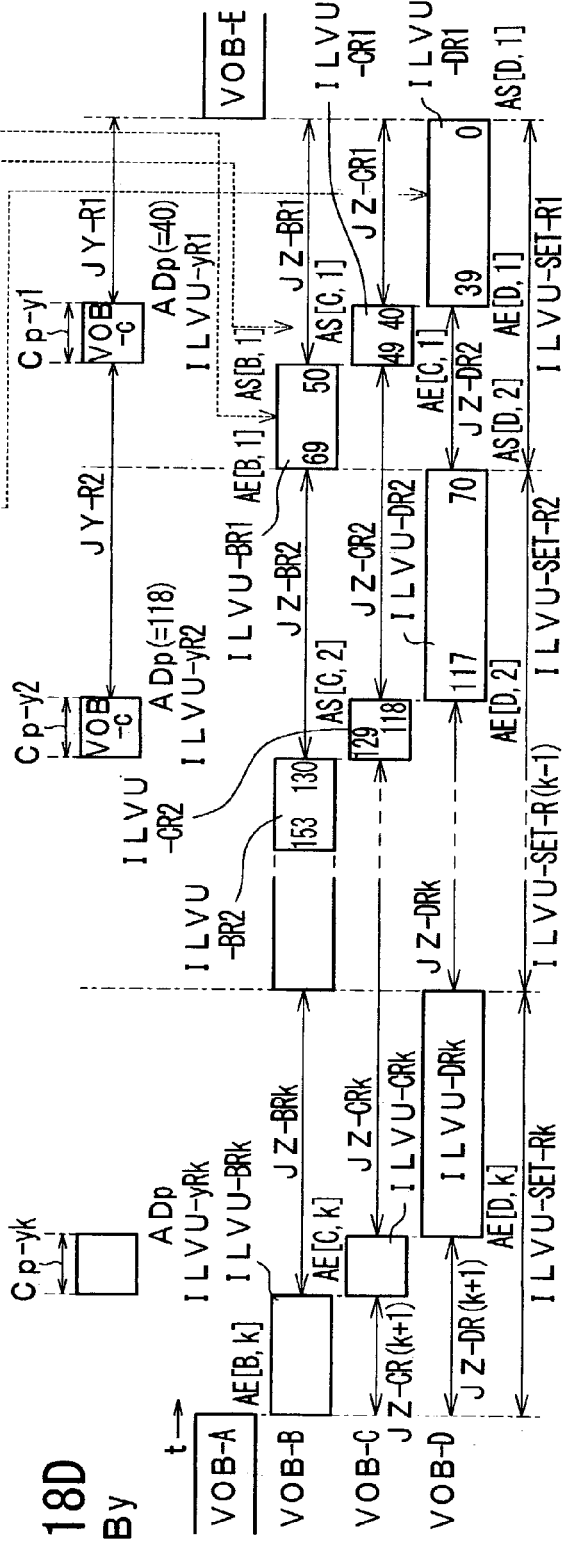
FIG. 18A VOB-B
FIG. 18B VOB-C
FIG. 18C VOB-D
FIG. 18D VOBy
FIG. 18E

METHOD AND APPARATUS FOR INTERLEAVE PROCESSING, AND COMPUTER PROGRAM PRODUCT FOR INTERLEAVE PROCESSING

FIELD OF THE INVENTION

The invention relates to a method and an apparatus for carrying out interleave processing. It relates more particularly to a method and an apparatus for interleaving a multiplicity of bit streams reliably by generating information that describes the structure (structural information) of the multiple bit streams to be interleaved, defining interleave processing segments in a backward direction relative to a forward flow direction of the bit streams set by the structural information, and arranging the interleave processing segments thus defined in the forward flow direction of the bit streams.

DESCRIPTION OF RELATED ART

In generating a signal containing of preferred contents using various materials such as image and audio and recording such the signal in a recording medium, video and audio signals of the materials have been encoded according to a prescribed compression standard and bit stream data in the form of the signals thus encoded (hereinafter referred to as [elementary streams]) has been then multiplexed into a multiplexed bit stream to store the multiplexed bit stream on record medium such as an optical disk.

Well-known standards for compressing graphical and audio signals are Moving Picture Experts Group (MPEG) standards. MPEG standards includes ISO-11172 known as MPEG1, ISO-13818 known as MPEG2, ISO-11172-1 and ISO-13818-1 for multimedia multiplexing, ISO-11172-2 and ISO-13818-2 for compressing video signals, and ISO-11172-3 and ISO-13818-3 for compressing audio signals.

FIG. 1 shows an exemplary MPEG system for compressing video signals using ISO-11172-2 or ISO-13818-2 and audio signals using ISO-11172-3 or ISO-13818-3 as the international standard to form digital data streams for the respective video and audio signals, then multiplexing these digital data streams, and separating the multiplexed data into respective data streams to obtain the video signal, audio signals and the like.

Referring to FIG. 1 showing schematically an MPEG system, the encoding device 100 is supplied with, for example, video signal Dv, audio signal Da and further information signal De.

The video encoder 101 encodes the video signal Dv to generate an elementary stream for the video signal (referred to as video stream). The audio encoder 102 encodes the audio signal Da to generate an elementary stream for the audio signal (referred to as audio stream). The information signal encoder 103 encodes the information signal De to form an elementary stream for the information signal (referred to as information stream). The multiplexer 104 multiplies these elementary streams to form an integral bit stream BS to be stored in a recording medium 120, for example. In EMPEG1 and EMPEG2 standards, synchronization information for synchronizing the image signal with the audio signal along the time axis is also included in the bit stream BS as auxiliary information when the elementary streams are multiplexed.

The exemplary MPEG system also has a decoding device 110, which includes a demultiplexer 111, a video decoder 112, an audio decoder 113, and an information decoder 114. The demultiplexer 111 demultiplies the bit streams retrieved from the recording medium 120 into all the elementary streams with their synchronized relation being maintained. The demultiplexer 111 then supplies the demultiplied elementary streams to the corresponding decoders 112-114. (That is, video elementary stream is supplied to the video decoder 112, audio elementary stream to the audio decoder 113, and information elementary stream to the information decoder 114.) The video decoder 112, the audio decoder 113, and the information decoder 114 decode the received respective elementary streams to generate the video signal Dv, the audio signal Da, and the information signal De, respectively, and output them at the respective outputs.

Suppose now that a multiplicity of scenes such as images of an object taken at different angles or mages of different stories having different data lengths are to be inserted between given scenes A and E. It is customary that in order to reproduce these scenes seamlessly or without being any temporal break if any scene is selected, interleave processing such that data associated with different scenes is segmented into small pieces and interleaved with one another. For example, data associated with different scenes B, C, and D are segmented into small pieces as interleave processing segment and then the segments are interleaved with each other between the scenes A and E, as shown in FIG. 2A. A combination of the segments is called Interleaved Units (ILVU) in DVD (Digital Versatile Disk) Video standard. Switching of scenes are carried out in ILVU.

In the example shown herein, ILVU-SET-1 consists of segments ILVU-B1, ILVU-C1, ILVU-D1 of scenes B, C, and D, respectively. Similarly, ILVU-2 and ILVU-3 also respectively consists of segments ILVU-B2, 3, ILVU-C2,3 and ILVU-D2,3 of each of the scenes B, C, and D. A domain of data where the segments are interleaved is called interleaved block. A small size of the ILVU allows quick switching of scenes when the scenes are switched.

When an interleaved signal is reproduced, signals for a desired scene are selected and used from the interleaved data stream. As an example, by successively selecting the signals associated with the scene C as shown in FIG. 2B, the signals may be reproduced with the scene A, the scene C, and the scene E being ordered.

It is often the case that, in order to select and use signals of preferred scenes, a buffer memory is provided to store a sufficient amount of multiplexed bit stream for the preferred scenes as shown in FIG. 3B. Signals associated with the preferred scenes are controlled so that they can be involved in the buffer memory if a signal read-out starting point jumps to another point in order to read them out in sequence as shown in FIG. 3A. This allows the preferred scenes to be seamlessly reproduced.

In addition, segmenting data of different scenes into smaller pieces and then arranging them alternately allows time required for the signal read-out starting point to jump to another point to retrieve signals of a preferred scene to be reduced. By doing so, interruption of reproducing image can be avoided if the memory capacity of the buffer memory is small. Further, it is possible to instantly switch from one scene to another.

In a case where a multiplexed bit stream is recorded on a DVD, the minimum size of ILVU Ms and the maximum jump distance JD when the signal read-out starting point jumps to another point are set forth in the DVD-Video Standard using Equations (1) and (2) below, since they depend on such parameters as the performance of the optical pickup used, transfer time to transfer data to a buffer memory, and the rate of decoding the multiplexed bit stream.

$$Ms(\text{pack}) = \text{necessary jumping time } Tjp(\text{sec})/RT(\text{sec}/\text{pack}) \quad (1)$$

$$JD = \text{Standard Lookup Table [data transfer time for ILVU]} \quad (2)$$

where necessary jumping time Tjp stands for time required for a jump, and RT for transfer time to transfer one ILVU.

The Standard Lookup Table [data transfer time for ILVU] defines the maximum jump distance JD in accordance with the data transfer time RT of the ILVU.

Interleaved video signal in DVD system has data structure such that each interleave-processing segment, for example, VOB-C1 (ILVU-C1) as in video object (VOB) is composed of video object units (VOBU) and each VOBU is composed of a number of packs, as shown in FIG. 4. Pack is a fundamental data unit in MPEG standard. VOBU is a decoding unit for special reproduction of data. VOB is a larger unit for reproduction of a scene such as scene A, scene B, and scene C.

The number of VOBUs in the interleave-processing segment and the number of packs in the VOBU are variable. The number of VOBs included in the interleaved block is also variable, varying in the range from 2 to the maximum number of VOBs that are allowable for being interleaved (The maximum number equals 9 in seamless angle mode of DVD-Video standard). Further, the number of the interleave-processing segments belonging to one interleaved block is the same for every scene, namely, three segments for each of the VOB-B, -C and -D. The interleave-processing segments of respective scenes occur in a same order in each set of ILVUs. For example, the segment, VOB-C1 of VOB-C follows the segment, VOB-B1 of VOB-B and the segment, VOB-D1 of VOB-D follows VOB-C1 of VOB-C, respectively, in a set of ILVUs, ILVU-SET-1. The same ordered segments occur in each set of the ILVUs, ILVU-SET-2 and -3. Portions of non-interleaved signals of the scenes A and E are called contiguous blocks.

As seen in FIG. 4, jump distance for reproduction of the scene C, VOB-C, illustratively is each of the distances from the end of VOB-A to the beginning of VOB-C1, from the end of VOB-C1 to the beginning of VOB-C2, from the end of VOB-C2 to the beginning of VOB-C3, and from the end of VOB-C3 to the beginning of VOB-E.

It is noted that the amounts of data contained in the respective elementary streams in a multiplex bit stream per unit of time are not fixed, since they are encoded data. For example, an image having less movement has smaller amount of data than an image having much movement has. As a consequence, if the interleave processing segments are set in unit of time to interleave the data in sequence along the forward direction of streaming, jump distances thereof cannot be determined or the amount of data of multiplexed bit stream to be stored in a buffer memory to secure seamless reproduction of image cannot be determined due to the indetermination of the jump distances. Thus, it is customary in the art of interleave processing such that a jump distance is previously set and/or the size of the segment is presumed.

In such interleave processing, it may happen that the jump distance which is adequate for one VOB can be improper for another VOB if the two VOBs have very different amounts of data. Then a failure of images can result. For example, when a jump distance is set appropriate for a VOB containing a large amount of data, retrieval of a VOB having only a small amount of data from a buffer memory can cause a shortage of data to be read out of memory in the midst of the jump, resulting in a breakdown of the reproduced image. On the other hand, when a size of the interleave-processing segment is presumed and the amount of data of VOB is regulated according to the presumed size, the amounts of data differ greatly between an almost still image and a fast moving image. In that event, reduction of data of a fast moving image results in deterioration of image quality.

Moreover, if a feedback control is introduced to increase or decrease jump distance and/or the size of the interleave-processing segment when the jump causes inconvenience such as a breakdown of the reproduced image, it takes much time to complete the interleave processing. In the feedback system where the size of the interleave-processing segment can be regulated only to increase for example, time required to finish the interleaving can be shortened as compared with the feedback system where the size of the interleave-processing segment can be increased and decreased. However, should some defect takes place once, the size of the segment, ILVU becomes very large, which hinders quick switching of the scenes, since scenes are switched according to the ILVU.

It is therefore an object of the invention to provide a method and an apparatus capable of interleave processing the bit stream using small interleave-processing segments, and a computer program product therefor.

SUMMARY OF THE INVENTION

In accordance with one aspect of the invention, there is provided an apparatus for interleave processing. The apparatus comprises structural information output means for outputting structural information on structures of respective multiple bit streams to be interleaved. The apparatus further comprises interleave-defining means for defining interleave processing. The interleave processing is carried out by defining interleave-processing segments in the respective multiple bit streams based on the structural information in a backward direction of the bit streams relative to a flow direction thereof. The interleave-processing segments thus defined are arranged in the flow direction of the bit streams.

In accordance with another aspect of the invention, there is provided a method of interleave processing. The method comprises a step of generating structural information on structures of respective multiple bit streams to be interleaved. The method also comprises a step of defining interleave-processing segments in the respective multiple bit streams based on the structural information in a backward direction of the bit streams relative to a flow direction thereof. The method further comprises a step of arranging the interleave-processing segments thus defined in the flow direction of the bit streams. This allows an interleaving operation to the bit steams to be defined.

In accordance with a still another aspect of the invention, there is provided a computer program product for allowing the computer to execute interleave processing. The computer program product comprises a procedure of loading structural information on structures of respective multiple bit streams to be interleaved into a computer. The computer program product also comprises a procedure of defining interleave-processing segments of the respective multiple bit streams based on the structural information in a backward direction of the bit streams relative to a flow direction thereof. The computer program product further comprises a procedure of arranging the defined interleave-processing segments in the flow direction.

In this invention, based on the structural information on interleave-processing segments to be interleaved in the bit stream, the segments are defined in a backward direction of the bit streams relative to a flow direction of the bit streams.

The segments are preferably defined every time one segment is set for each of the respective bit streams. In setting the segments for each of the respective bit streams, the segment of one bit stream is preferably set following the set segment of other bit stream.

When the segments are defined in sequence so that an amount of data of the rest of the bit streams is not enough for the final interleave-processing segment, the rest data is suitably distributed among the segments that have been already defined.

Further, at the time for beginning of interleave processing or each time the interleave-processing segments are defined, a temporary interleave-processing segment is set to bit stream. The bit stream is selected from any one of the bit stream having the shortest reproduction time for undefined portion of the interleave-processing segment and the bit stream having the smallest amount of data when more than one bit streams have the shortest reproduction time. Thus, the interleave-processing segments in the respective multiple bit streams are suitably set in sequence based on the temporary setting of the interleave-processing segment in a backward direction of the bit streams relative to a flow direction thereof.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 2A and 2B are diagrams illustrating interleave processing and reproduction processing thereof, respectively;

FIG. 6 is a diagram showing an arrangement of VOBs;

FIGS. 8A through 8D are diagrams illustrating how to generate interleave information;

FIG. 13 shows interleave information in a tabulated form;

FIG. 18 is a diagram illustrating second interleave processing.

DETAILED DESCRIPTIOIN OF PREFERRED EMBODIMENTS

The invention will now be described in detail by way of example with reference to accompanying drawings. A signal multiplexer encodes digital video signals, digital audio signals, and other types of information signal of different scenes to generate respective elementary streams. Schedule information needed to packetize the respective elementary streams and to pack the packets is also generated from information obtained in the process of encoding the bit streams. Further, interleaved information that describes how signals of the respective scenes should be interleaved is generated. Based on the interleaved information and the schedule information, elementary streams of each scene are multiplexed into a multiplexed bit stream for each scene. The multiplexed bit streams of the respective scenes are interleaved into bit streams BS before they are recorded on a recording medium such as an optical disk.

Figure 1:
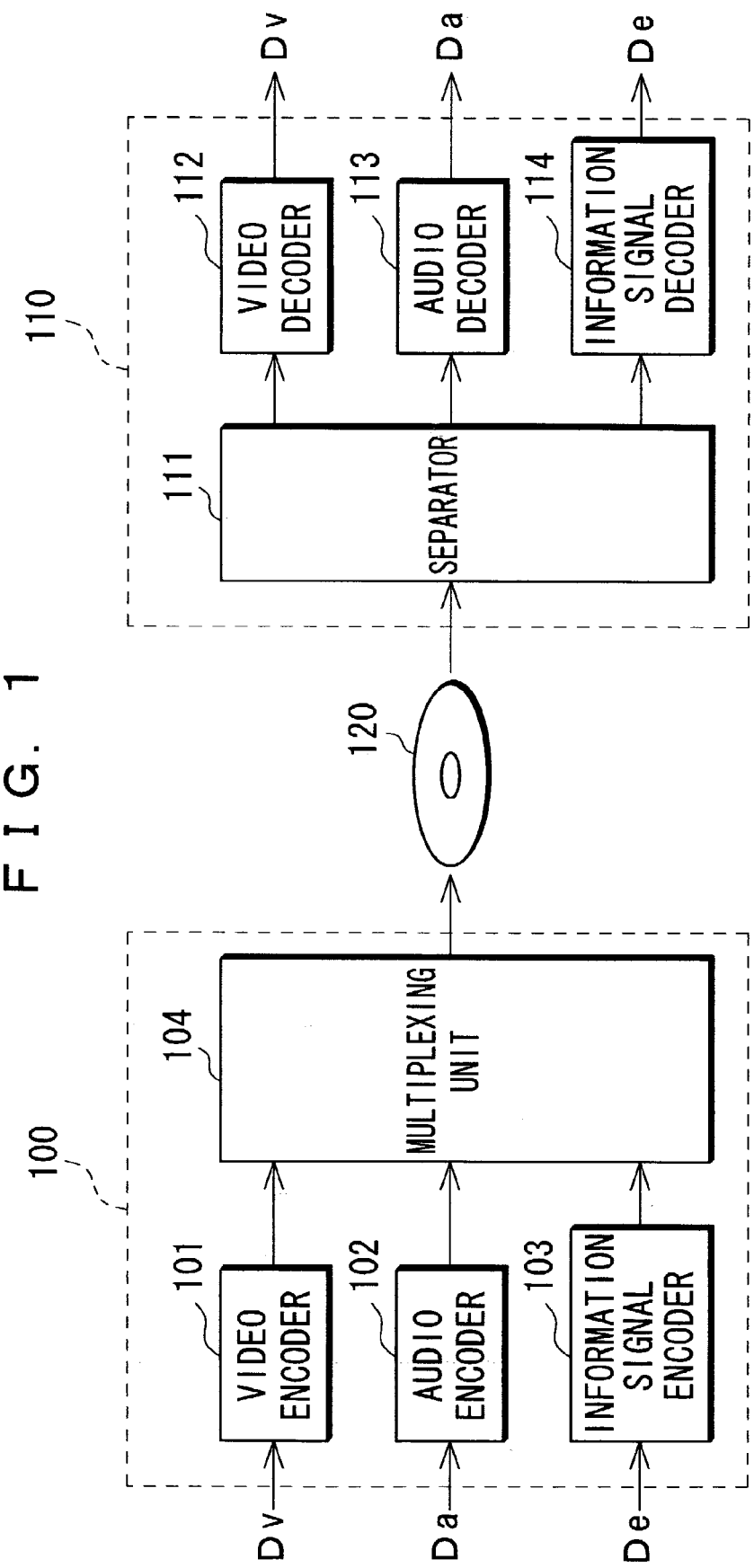
FIG. 1 is a schematic block diagram showing a configuration of a conventional MPEG system.
Figure 3A:
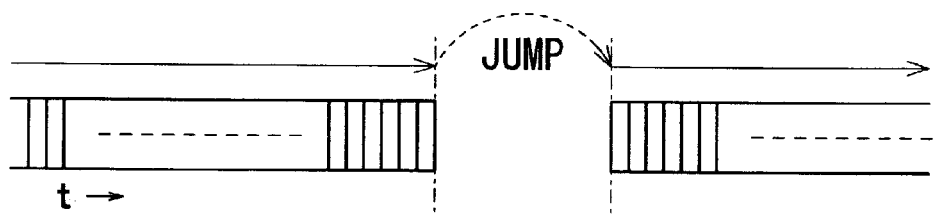
FIGS. 3A and 3B are diagrams showing a relationship between a jump operation and an amount of data stored, respectively.
Figure 3B:
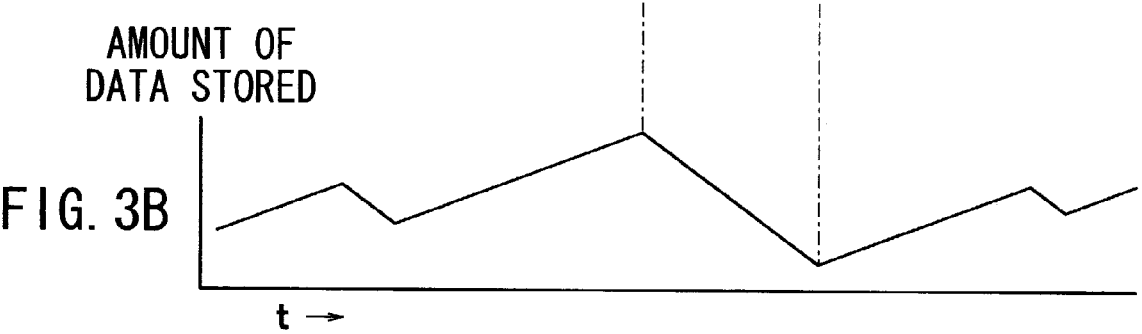
Figure 4:
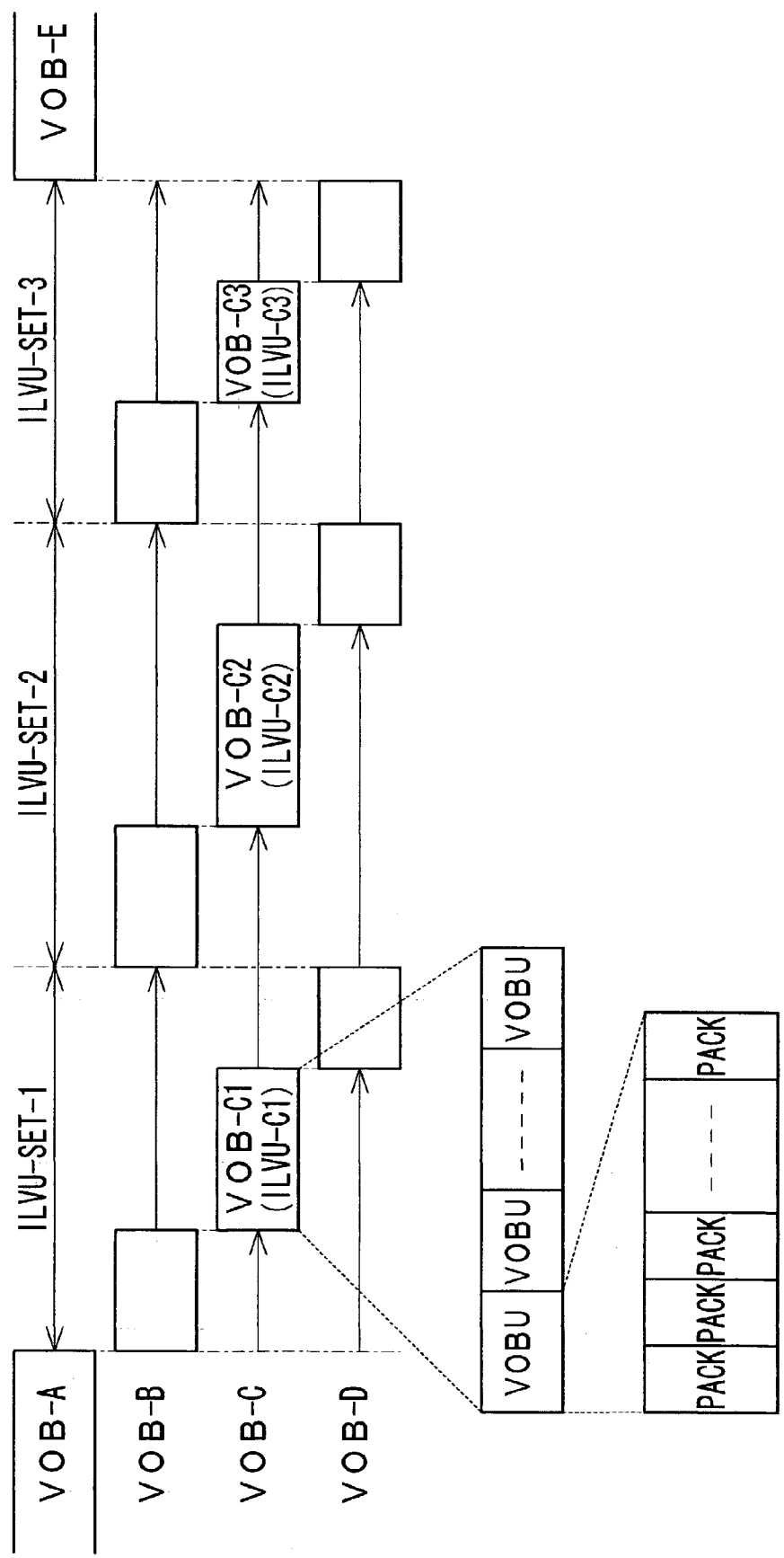
FIG. 4 is a diagram showing a data structure of an interleaved bit stream.
Figure 5:
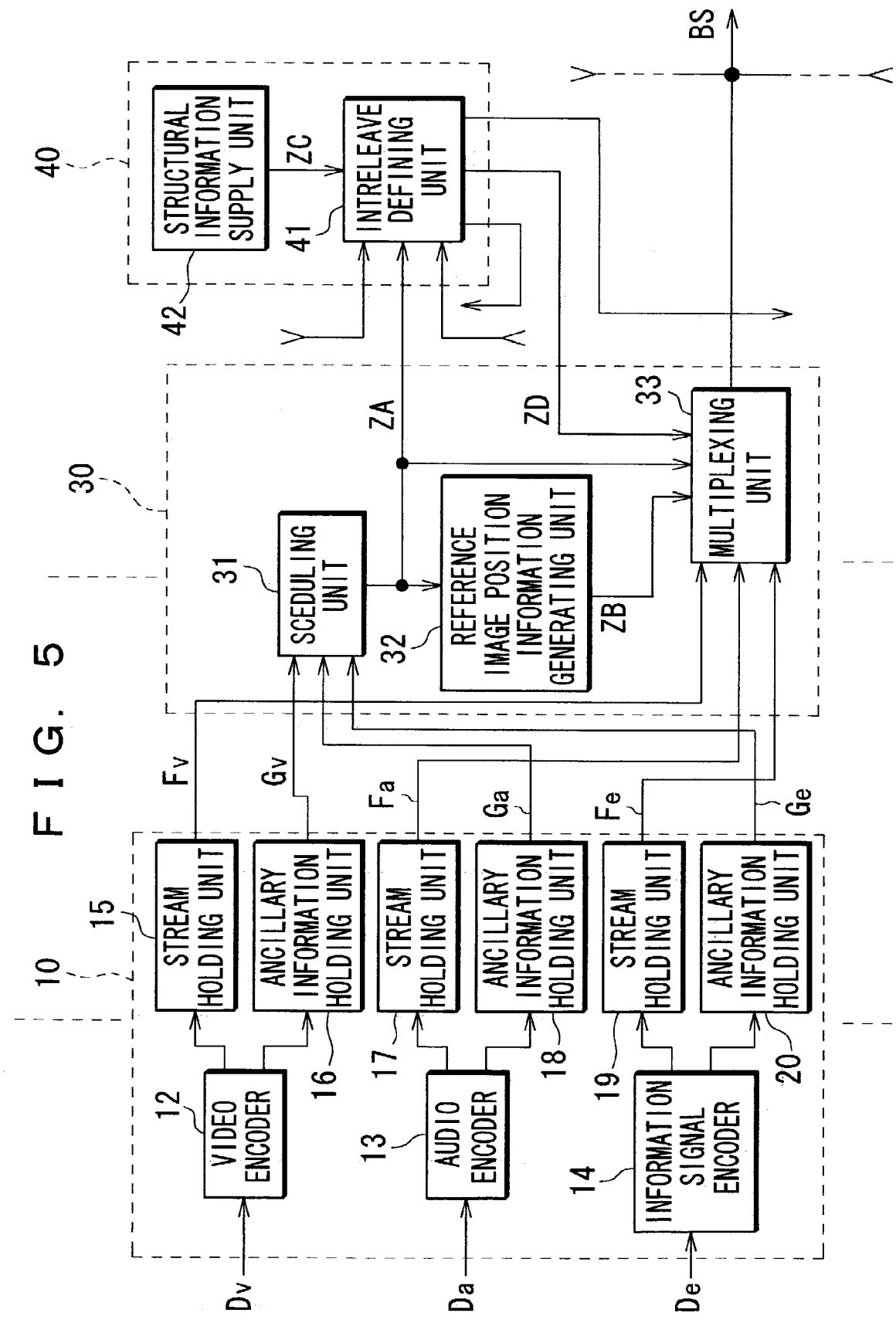
FIG. 5 is a block diagram representation of a signal multiplexing apparatus according to the invention.

FIG. 5 is a schematic diagram showing a configuration of the entire signal multiplexer in a functional block form. This signal multiplexer has an encoding device 10 and a multiplexing device 30 for each scene as well as an interleave-processing device 40 for controlling interleave processing of the bit streams for multiple scenes to generate one bit stream BS from the bit streams for multiple scenes. In FIG. 5, one encoding device 10 and one multiplexing device 30 are merely shown.

An encoding device 10 for each scene has, for example, a video encoder 12, an audio encoder 13, and an information signal encoder 14. The video encoder 12 receives a digital video signal Dv, which is raw image data for a scene. The audio encoder 13 receives a digital audio signal Da, which is raw audio data for the scene. The information signal encoder 14 receives a digital information signal De for the scene.

The video encoder 12 compresses and encodes the received video signal Dv using a moving picture encoding standard such as MPEG2 standard. A stream holding unit 15 then receives and stores the compressed and encoded video signal Dv as an elementary stream Fv. An ancillary information holding unit 16 receives and stores information obtained during the encoding such as the information on the size of an accessible unit, DTS (Decoding Time Stamp, which is time management information on decoding), PTS (Presentation Time Stamp, which is time management information for reproduction) as ancillary encoding information Gv. The ancillary encoding information Gv is needed to demultiply the multiplexed bit streams into separate streams of video, audio, other types of information and the like.

The audio encoder 13 encodes and compresses the received audio signal Da using an audio encoding scheme such as MPEG audio system. A stream holding unit 17 receives and stores the encoded and compressed audio signal Da as an elementary stream Fa. An ancillary information holding unit 18 receives and stores information obtained during the encoding as ancillary encoding information Ga.

The information signal encoder 14 encodes the received information signal De. A stream holding unit 19 receives and stores the encoded signal as an elementary stream Fe. An ancillary information holding unit 20 receives and stores information obtained during this encoding as ancillary encoding information Ge.

The multiplexing device 30 has a scheduling unit 31, a reference image position information generating unit 32, and a multiplexing unit 33.

The scheduling unit 31 constructs schedule information ZA including information needed to packetize the bit streams or pack the packets, information indicative of a structure of packs in the VOBU, and information indicating a structure of VOBUs in the VOB, using the ancillary encoding information Gv, Ga, and Ge stored in the ancillary information holding units 16, 18, and 20. The scheduling unit 31 then supplies the schedule information to the reference image position information generating units 32, the multiplexing unit 33, and the interleave defining unit 41 of the interleave-processing device

40. The scheduling unit 31 has information for packing that includes System Clock Reference (SCR), Program Multiplexing Rate, Stuffing Bit Length, and Packets Number N in a pack. The scheduling unit 31 also has information for packetizing that includes Stream ID consisting of Stream Type (representing a type of an elementary stream) and Buffer Number (which is a number assigned to one elementary stream when more than one elementary streams have the same type), Packet Length, PES (Packetized Elementary Stream) Header Length, PTS (Presentation Time Stamp), and DTS (Decoding Time Stamp).

The ancillary encoding information Gv, Ga, and Ge include a size of an accessible unit, PTS, and DTS, so that the scheduling unit 31 can determine the lengths and the combinatory order of the packs on video, audio, and other type of information without analyzing the respective elementary streams stored in the stream holding units 15, 17, and 19.

The reference image position information generating unit 32 generates reference image position information ZB using the schedule information ZA and supplies it to the multiplexing unit 33.

The reference image position information ZB includes information such as Program Stream Map (PSM) Packet and Program Stream Directory (PSD) Packet, and is included in each of the packs composing the multiplexed streams.

A structural information supply unit 42 is connected to the interleave defining unit 41 of the interleave-processing device 40. The structural information supply unit 42 supplies the interleave defining unit 41 with structural information ZC that indicates how to use the VOBs for each scene to generate the bit streams BS for desired contents.

Figure 6:
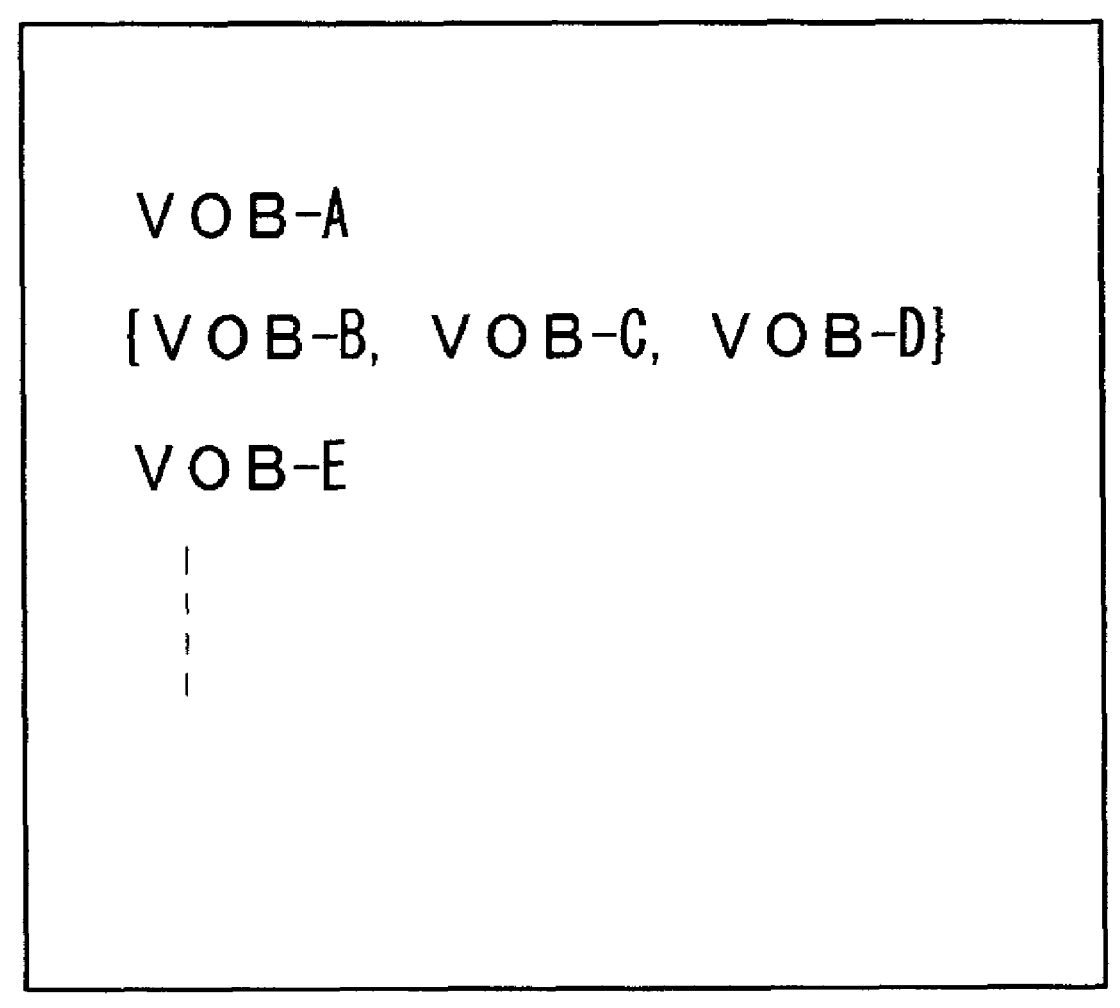

FIG. 6 illustrates an exemplary structural information ZC, showing a case where any one of multiple scenes B, C, and D can be illustratively selected and disposed between the scene A and the scene E. It is noted that VOB-A is associated with the scene A. VOB-B, VOB-C, VOB-D, and VOB-E are associated with the scenes B, C, D and E, respectively.

Using the schedule information ZA generated by the scheduling unit 31 provided for each scene and the structural information ZC generated by the structural information supply unit 42, the interleave defining unit 41 generates interleave information ZD. The interleave information ZD indicates an order of VOBs and an amount of data used for generating the bit streams BS. This interleave information ZD is supplied to the multiplexing unit 33 provided for each scene.

The multiplexing unit 33 packetizes the respective elementary streams Fv, Fa, and Fe held in the stream holding units 15, 17, and 19, respectively, based on the schedule information ZA and the reference image position information ZB and packs the packets to generate in sequence a multiplexed bit stream conforming to, for example, DVD-video standard by the amount of data (e.g. a given number of packs) indicated by interleave information ZD.

Multiplexing unit provided for each scene generates multiplexed bit streams according to the order based on the interleave information ZD, so that a series of the multiplexed bit streams thus interleaved can be generated for each scene. Therefore, by merging into one bit stream the multiplexed bit streams generated by the multiplexing unit 33 for each scene, the resultant bit stream BS allowing seamless reproduction of desired contents containing various visual and audio materials can be obtained.

Figure 7:
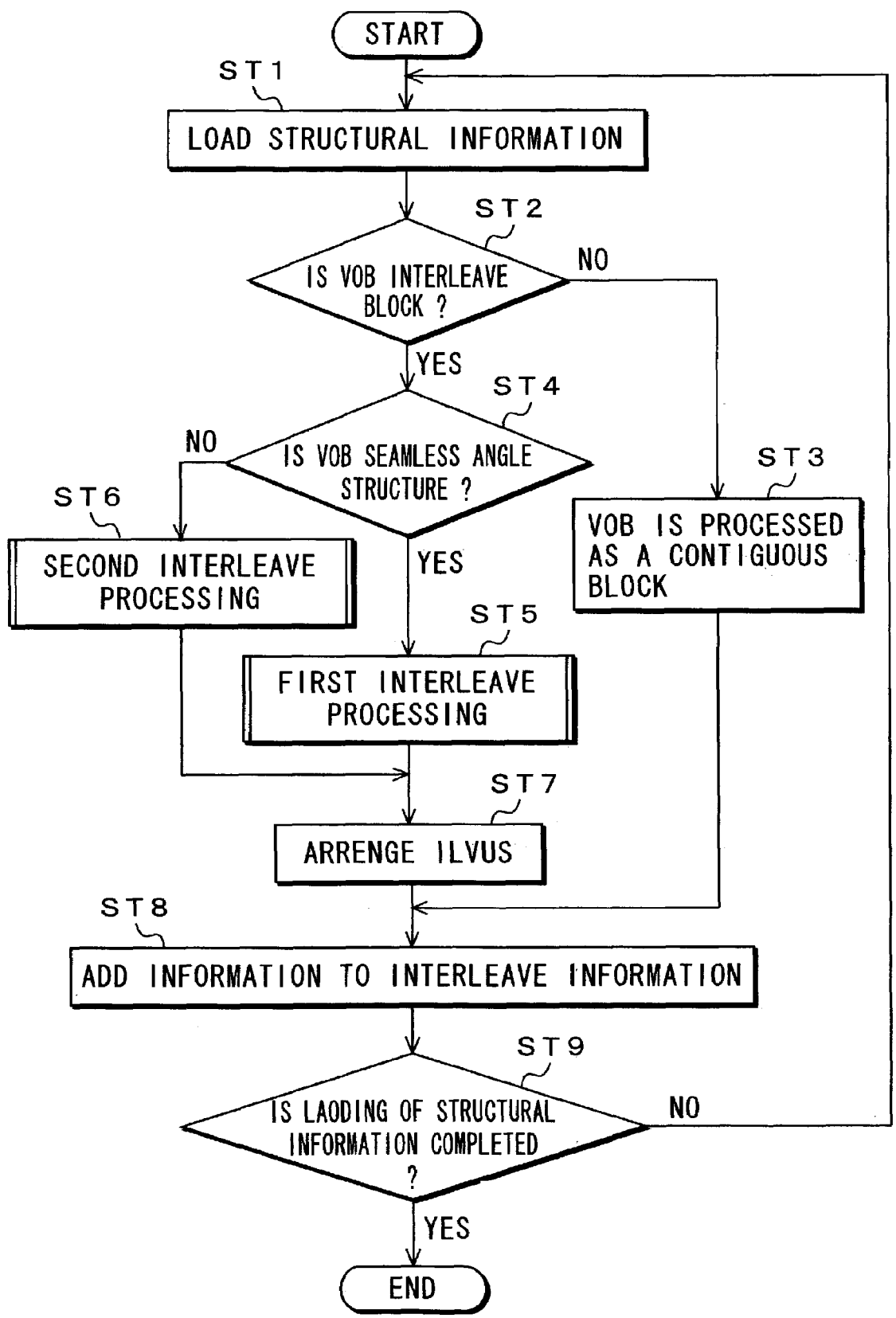
FIG. 7 is a flowchart showing operations for generating interleave information.

Next, operations for generating interleave information in the interleave defining unit 41 will be described. FIG. 7 is a flowchart illustrating the operations for generating the interleave information in a case where the bit stream BS is formed and recorded on a DVD.

In step ST1, structural information ZC is loaded from the structural information supply unit 42. In step ST2, a determination is made based on the loaded structural information ZC as to whether given VOB belongs to an interleave block to be interleaved. When it is determined that the VOB is not to be interleaved, the procedure proceeds to step ST3, and otherwise the procedure proceeds to step ST4.

In step ST3, the VOB is processed as a contiguous block. That is, the VOB is placed contiguous to the preceding VOB. Then the procedure proceeds to step ST8.

In step ST4, a determination is made as to whether the interleave processing concerns seamless angle structure. At this stage, if a seamless reproduction is intended by selection of any scene using the scenes each having the same reproduction time, for example, a multiplicity of scenes each having the same reproduction time (e.g. multiple scenes given by taking an object associated with different angles), the procedure proceeds to step ST5.

If instead a seamless reproduction is intended by selection of any scene using the scenes having different reproduction times, for example, a multiplicity of scenes that belong to different stories, the procedure proceeds to step ST6.

In step ST5, interleave processing of seamless angle structure (referred to as "first interleave processing") based on the loaded structural information ZC.

FIG. 8 illustrates generation of interleave information ZD for seamless reproduction by the selection of any scene using the scenes each having the same reproduction time, for example, multiple scenes given by taking an object associated with different angles. FIGS. 8A through 8C respectively show VOB-B, VOB-C, and VOB-D, and FIG. 8D shows a structure of interleaved data.

Figure 9:
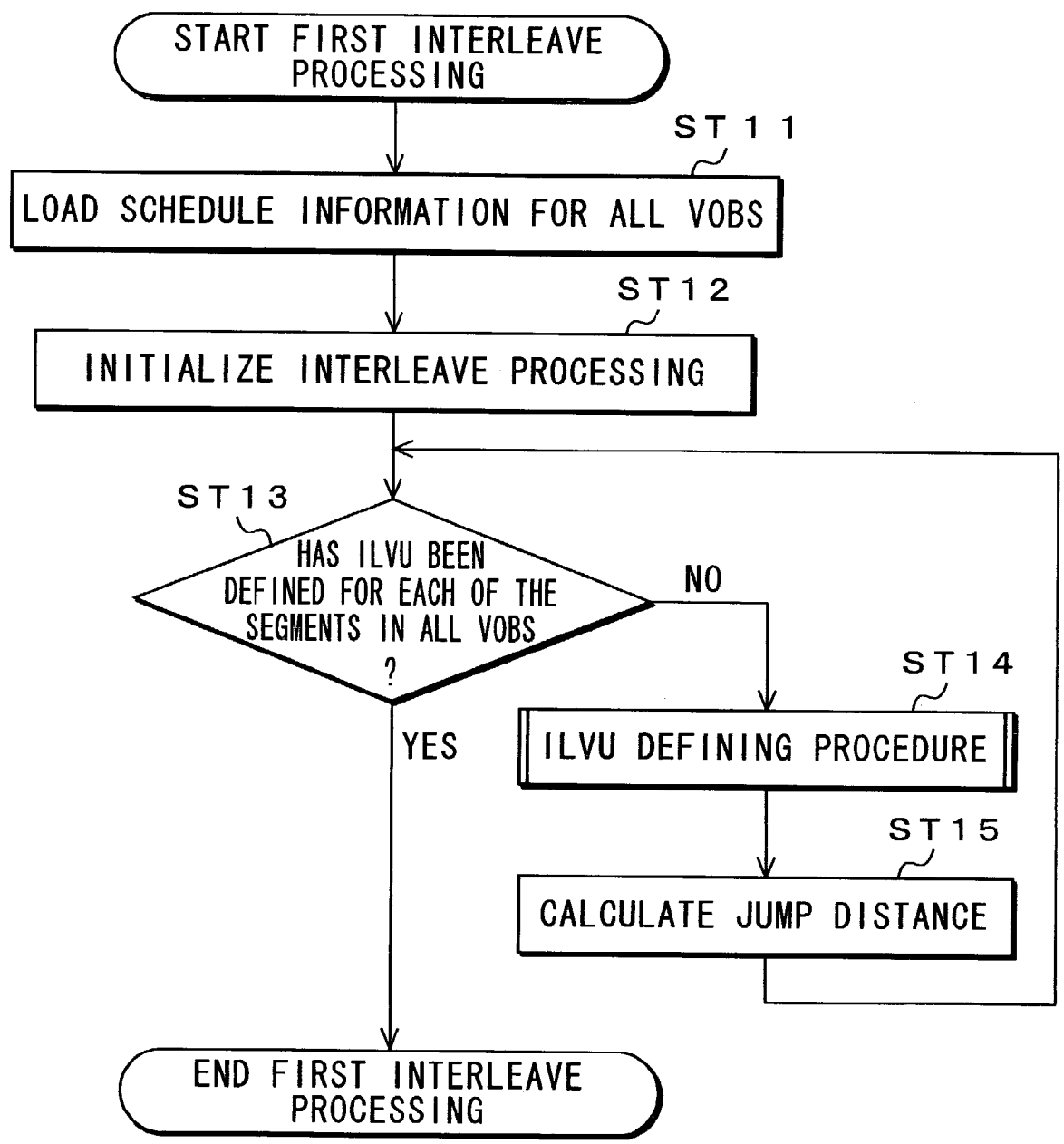
FIG. 9 is a flowchart showing first interleave processing.

FIG. 9 is a flowchart showing the first interleave processing. In step ST11, schedule information for all the VOBs composing the interleave block is loaded, and then the procedure goes to step ST12.

In step ST12, initialization is made for the interleave processing. In this initialization, when the interleave processing is executed using multiple VOBs, a first reference position for calculating jump distances is set to the final position of the final interleave-processing segment (for example, ILVU-DR1 shown in FIG. 8D) in the VOB, which will come finally (referred to as the final VOB) in the interleaved VOBs.

A VOB pointer position Pv is set to the final VOB. A VOBU pointer position Pu is set to the final VOBU of the final VOB. The initial value of address AD is set to 0.

In step ST13, a determination is made if ILVU has been defined for each of the segments, ILVUs in all the VOBs. If not defined, the procedure proceeds to step ST14 to continue defining the ILVU.

Figure 10:
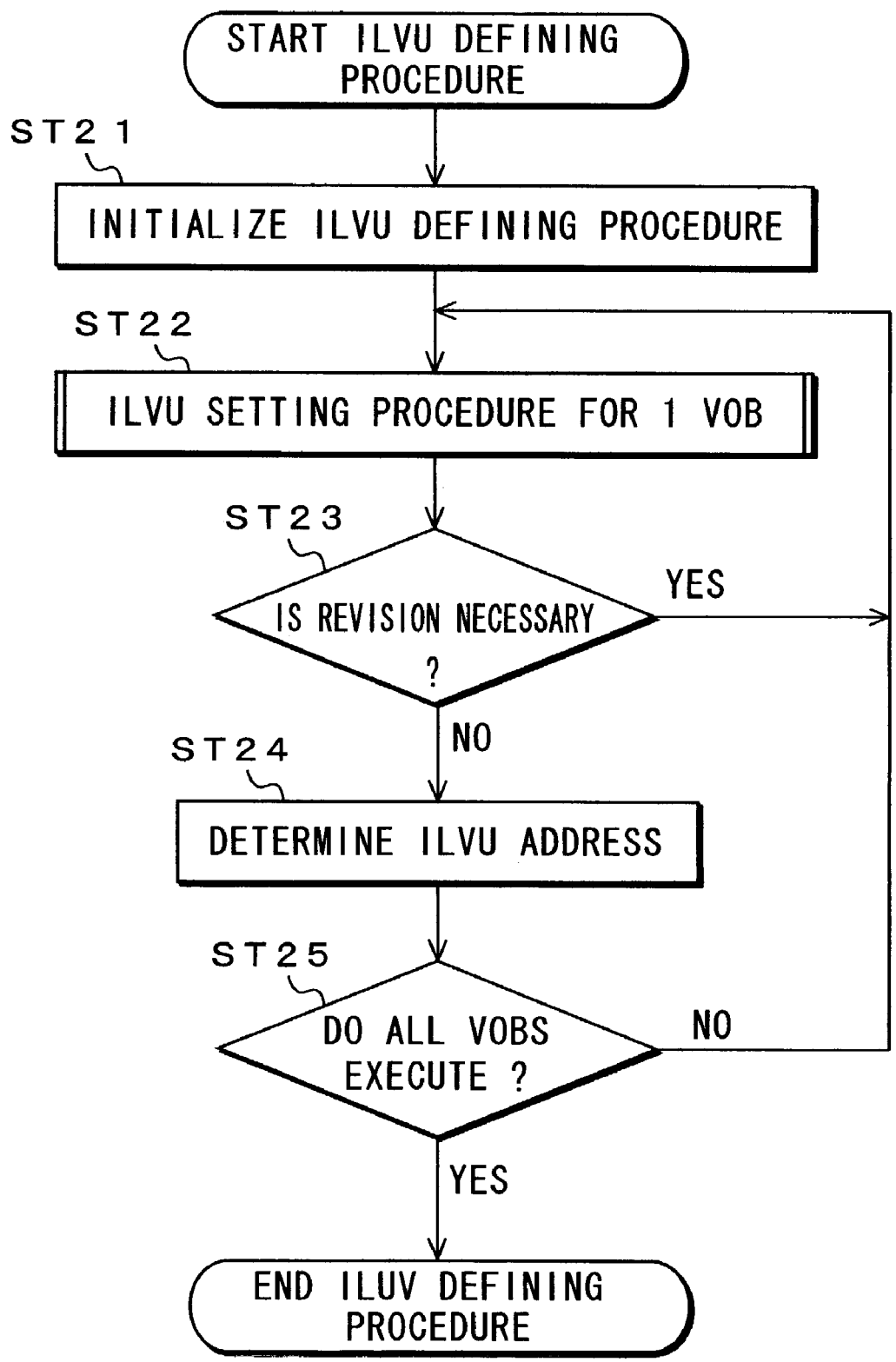
FIG. 10 is a flowchart illustrating an ILVU defining procedure.

FIG. 10 is a flowchart illustrating the process of defining ILVU to the interleave-processing segment in the bit streams (referred to as "ILVU defining procedure"). In step ST21, the ILVU defining procedure is initialized so that the initial necessary VOBU number Nv necessary in the ILVU defining procedure is set to 0.

Next, in step ST22, a process of setting an ILVU (referred to as "ILVU setting procedure") is performed for one VOB (for example, VOB-D shown in FIG. 8D).

Figure 11:
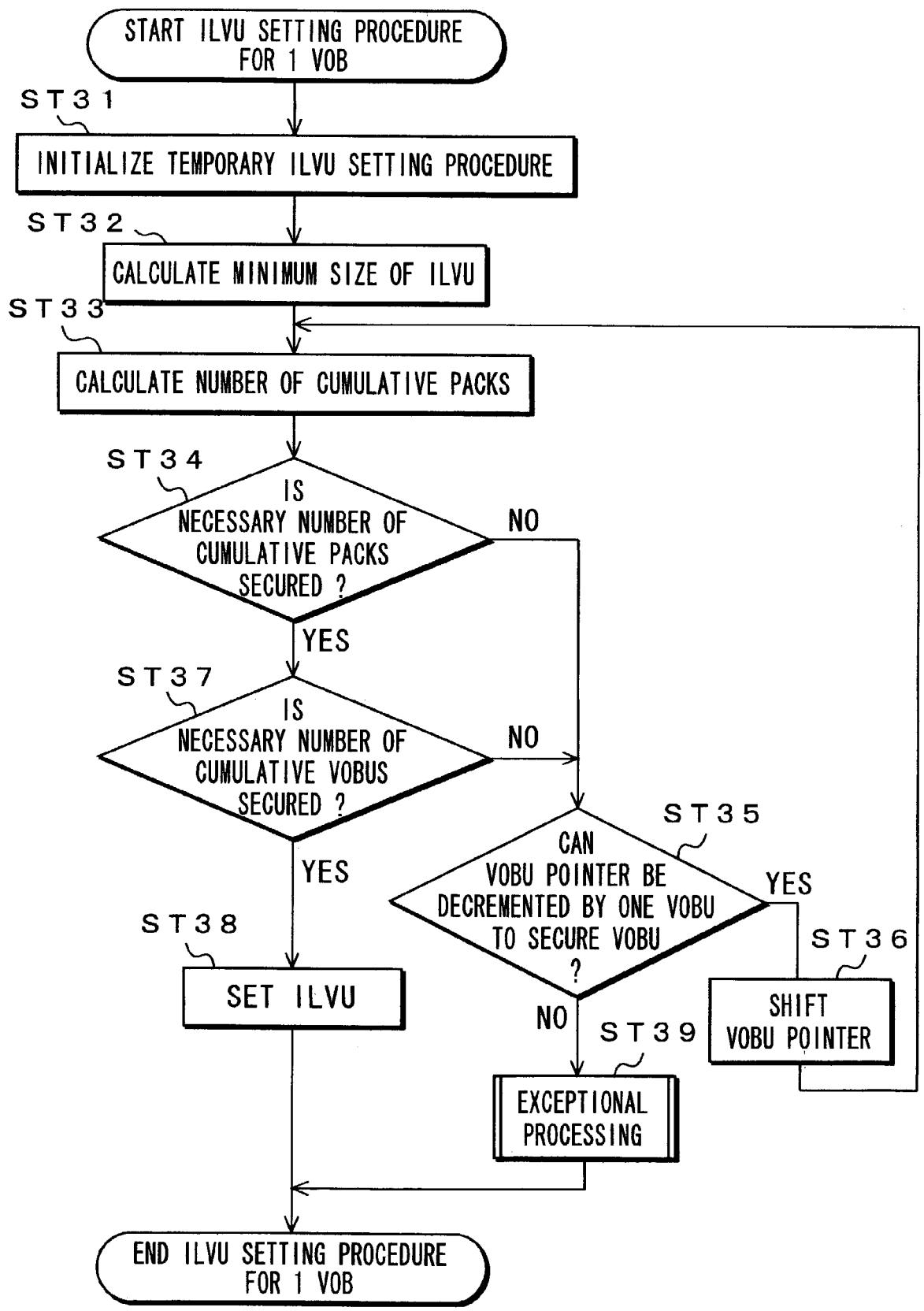
FIG. 11 is a flowchart illustrating an ILVU setting procedure for one VOB.

FIG. 11 is a flowchart illustrating the ILVU setting procedure for one VOB.

In step ST31, an initialization is made for a temporary ILVU setting procedure. In this initialization, the number of cumulative packs Cp, data transfer time RTs, and the number of cumulative VOBUs Cv are set to respective initial values. For example, number of the cumulative packs Cp and number of the cumulative VOBUs Cv are set to 1, respectively, and the data transfer time RTs is set to 0.

In step ST32, a minimum size of ILVU Ms is calculated and set to a temporary ILVU for one VOB. In the calculation of the minimum size of ILVU Ms, the maximum jump distance JD can be obtained from the above Equation (2), and necessary jumping time Tjp for a jump is obtained from Standard Table that lists in the DVD-Video Standard, as using Equation (3). The necessary jumping time Tjp thus obtained and the data transfer time RT for the VOB indicated by VOB pointer position Pv are substituted in the Equation (1) to calculate the minimum size of ILVU Ms.

$$\text{Tjp=Standard Table [maximum jump distance JD]} \quad (3)$$

where the Standard Table [maximum jump distance JD] defines the necessary jumping time Tjp as a function of maximum jump distance JD. The data transfer time RT is also included in the schedule information ZA associated with a VOB.

In step ST33, the number of cumulative packs Cp is calculated. The number of cumulative packs Cp represents the cumulative number of packs included in the VOBU indicated by VOBU pointer position Pu at the time of beginning the ILVU setting procedure for the one VOB through the VOBU indicated by current VOBU pointer position Pu. After the calculation of the number of cumulative packs Cp, the procedure proceeds to step ST34.

In step ST34, it is determined whether or not the number of cumulative packs Cp has exceeded the minimum size of ILVU Ms, that is, whether a necessary number of packs are available for one temporary ILVU. If the number of cumulative packs Cp is less than the minimum size of ILVU Ms, the procedure proceeds to step ST35. If, on the other hand, the number of cumulative packs Cp has reached the minimum size of ILVU Ms, the procedure proceeds to step ST37.

In step ST35, a determination is made if VOBU pointer position Pu can be decremented by 1 VOBU in the interleave-processing segment of the VOB indicated by the VOB pointer position Pv (i.e., if the pointer Pu can be shifted backward to a position of last VOBU, namely, moved in a direction of the arrow of the pointer Pu shown in FIG. 8C to a position of last VOBU). If VOBU pointer position Pu can be decremented by 1 VOBU, the procedure proceeds to step ST36. If VOBU pointer position Pu is shifted backward in turn to reach a beginning of the VOB (for example, the beginning of the VOB-D shown in FIG. 8C) so that it cannot be decremented any more, the procedure proceeds to step ST39.

In step ST36, VOBU pointer position Pu is shifted. The VOBU pointer position Pu is moved backward toward a position of last VOBU and the number of cumulative VOBUs Cv is incremented by 1. Then, the procedure returns to step ST33 where the number of packs to the new VOBU pointer position Pu is calculated.

When the number of cumulative packs Cp has been judged to have reached the temporary ILVU, namely, the minimum size of ILVU Ms in step ST 34, the procedure has proceeded to step ST37 where it is determined if the number of cumulative VOBUs Cv has reached or exceeded necessary VOBU number Nv to secure VOBUs for 1temporary ILVU. If the number of cumulative VOBUs Cv has not reached the necessary VOBU number Nv, the procedure proceeds to step ST35. If the number of cumulative VOBUs Cv has reached the necessary VOBU number Nv, the procedure proceeds to step ST38.

In step ST38, the VOBU indicated by VOBU pointer position Pu is once set to a final position of the interleave-processing segment as ILVU for the VOB indicated by the VOB pointer position Pv (for example, a final position, Pa of ILVU-DR1 shown in FIG. 8D). The ILVU setting procedure is then finished.

When the procedure has proceeded to step ST39 because it has been judged that the VOBU pointer position Pu cannot be decremented by 1 VOBU in step ST35, an exceptional processing is done in step ST39. The exceptional processing will be described later.

After the ILVU setting procedure is finished, it is determined in step ST23 shown in FIG. 10 if a revision of the setting is necessary or not. The revision is not necessary when the necessary VOBU number Nv is equal to the initial value 0, and the number of cumulative VOBUs Cv is set to the necessary VOBU number Nvn. Then, the procedure proceeds to step ST24.

If the necessary VOBU number Nv is not equal to the initial value 0, but the necessary VOBU number Nv used in step ST37 is equal to the new necessary VOBU number Nvn as determined by Equation (4) below, revision is again regarded unnecessary. Then, the procedure also proceeds to step ST24.

If the necessary VOBU number Nv is not equal to the new necessary VOBU number Nvn, the setting obtained by the above ILVU setting procedure is discarded. The necessary VOBU number Nv is then replaced by the new necessary VOBU number Nvn obtained from the Equation (4) and the processing returns to step ST22 to perform ILVU setting procedure again for the first VOB.

$$\text{Nvn=max(Nv, Cv)} \quad (4)$$

This Equation (4) implies that, of the necessary VOBU number Nv used in step ST37 and the number of cumulative VOBUs Cv obtained by the ILVU setting procedure, a lager one is employed as the new necessary VOBU number Nvn.

In step ST24, addresses associated with one interleave-processing segment as ILVU for the set one VOB (for example, ILVU-DR1 shown in FIG. 8D) are determined based on the number of cumulative packs Cp determined in the ILVU setting procedure for one VOB. In determining the addresses, address AD is used as the starting address AS [j, k] of one interleave-processing segment as ILVU in the set VOB, where j stands for a kind of the VOB to be interleaved, and k stands for the order of the ILVU. The ending address AE [j, k] is given by adding the number of cumulative packs Cp obtained in the ILVU setting procedure to the address AD. The ending address AE is further incremented by 1 to define new address AD.

In step ST25, it is determined if all the VOBs execute or not, that is, if ILVU setting procedure for each VOB has been completed or not. If ILVU setting procedure has not been completed for each VOB, the procedure returns to step ST22. When completed, each of the interleave-processing segments, ILVUs (for example, ILVU-BR1, -CR1, and -DR1 shown in FIG. 8D) that have been set in the step ST22 is defined to the interleave-processing segment for each VOB included in a set of ILVUs, for example, ILVU-SET-R1. This processing will be referred to as ILVU defining procedure. The procedure then ends the ILVU defining procedure, and proceeds to step ST15.

In step ST15, jump distance in each VOB is calculated using the starting address AS [j, k] and the ending address AE [j, k] of the defined interleave-processing segment as ILVU for each VOB. In this jump distance calculation, the jump distance is calculated from the starting address AS [j, k] of the interleave-processing segment as ILVU (for example, VOB- DR2 shown in FIG. 8D) in the VOB defined at step 14 and the ending address AE [j, k−1] of last segment, ILVU (for example, ILVU-DR1 shown in FIG. 8D) placed in last ILVU-SET at the same VOB. For example, the distance between the addresses "n+a" and "n" can be calculated by calculating the difference between the address "n+a" and "n" and then subtracting 1. Thus, the jump distance JW can be calculated by subtracting the ending address AE [j, k−1] and 1 from the starting address AS [j, k]. In a case where first interleave-processing segment as ILVU has been defined, it has starting address AS [j, 1] but has no last segment, in last ILVU-SET at the same VOB. In this case, ending address AE [j, 0] is assumed to be the initial value of address AD, i.e. 0. After finishing the calculations of jump distances in step ST15, the procedure proceeds to step ST13.

In this manner, in the ILVU defining procedure, the interleave-processing segments as ILVUs are set in sequence following the ILVUs that have been set, in a backward direction with respect to a flow direction of the bit streams. Thus, jump distances between the different interleave-processing segments as ILVUs in each VOB can be easily calculated based on the ILVUs that have been set or defined.

In step ST13, it is determined if ILVU has been defined for each of the segments in all the VOBs. If not defined, the procedure proceeds to step ST14 where ILVU is defined for the next segment.

As the ILVU defining procedure is repeated in this way, VOBU pointer position Pu moves backward towards the beginning of the VOB. The VOBU pointer position Pu eventually reaches the beginning of the VOB. If in step ST35, VOBU pointer position Pu cannot move any farther, the procedure proceeds to step ST39 to process the exceptional instance.

Figure 12:
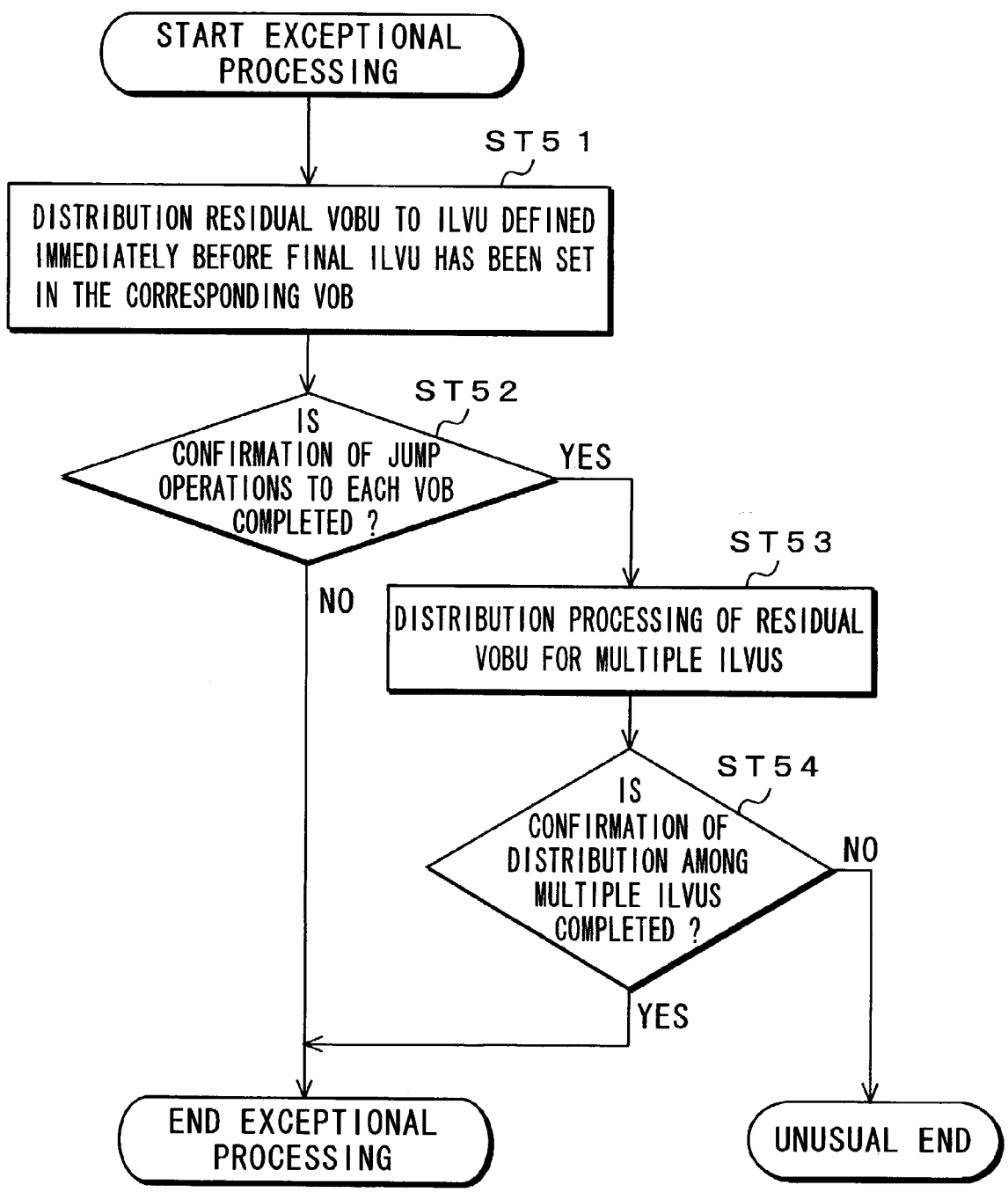
FIG. 12 is flowchart illustrating an exceptional processing.

FIG. 12 is a flowchart showing exceptional processing. Step ST51 executes additive processing of residual VOBUs in exceptional cases. That is, when the residual bit streams are too small so that an amount of data of the residual bit streams can not be enough for ILVU, namely, residual VOBUs are too few to set an ILVU, the residual VOBUs are distributed to the interleave-processing segment as ILVU defined immediately before the final segment has been set in the same VOB, and the address AD is shifted by the added counts of the VOBU.

In step ST52, a decision is made as to whether jump operations have been completed for all of the VOBs when the residual VOBU are distributed for the each VOB. In the event that jump distance JW does not exceeds the maximum jump distance JD if the jump distance JW has extended by the addition of the residual VOBU, the exceptional processing is ended to proceed to the next step. On the other hand, if the jump distance JW exceeds the maximum jump distance JD based on an extension of jump distance JW, the procedure proceeds to step ST53.

In step ST53, since the residual VOBU is distributed to the ILVU defined immediately before the final ILVU has been defined in the corresponding VOB so that the jump distance JW is extended, a distribution processing is made for distributing the residual VOBU among multiple ILVUs. In the distribution processing among the multiple ILVUs, the distribution is made by dividing the residual VOBU by the number of defined interleave-processing segments as ILVUs, for example, and adding the number of VOBUs in each ILVU by the divided amount. The address of the ILVU added with the residual VOBU are recalculated after the distribution of the residual VOBU.

In this way an increment of the jump distance JW may be suppressed if the residual VOBU is distributed. Alternatively, residual VOBU may be distributed in the reverse order with respect to the defining order of the ILVUs for each of the predetermined amounts of bit streams. In this case, the residual VOBU distribution can be finished when the cumulative increment of a VOBU has reached the number of the residual VOBUs. This allows recalculations of addresses to be minimized.

In step ST54, a determination is made if confirmation of the jump operations has been done after the distribution of the residual VOBU among multiple ILVUs. If the respective jump distances JW for the multiple ILVUs after the distribution do not exceeds the maximum jump distance JD, the exceptional processing is ended. Then the procedure proceeds to the next step. However, if any one of the jump distances JW exceeds maximum jump distance JD, proper reproduction of data cannot be guaranteed. Thus, the instance is identified to be anomalous. In this case, the processing ends up with abnormal termination, aborting generating interleave information ZD.

In this way, through the exceptional processing of the residual VOBUs in the event that the VOBUs are too few to define an interleave-processing segment as ILVU, it is possible to define the ILVUs involving all the VOBUs.

After the completion of the first interleave processing in step ST5, the procedure proceeds to step ST7 of FIG. 7. In step ST7, the segments are arranged in the forward direction (i.e. in the flow direction of bit streams) since the definition of the segments has been made from the rear end of each of the segments. The procedure then proceeds to step ST8.

In step ST8, information needed to generate a bit stream BS is generated using VOB signals for each segment, ILVU based on the arranged results in step ST7. The information is added to interleave information ZD. The procedure then proceeds to step ST9.

In step ST9, a determination is made whether loading of structural information ZC has been completed or not. If it is not, the procedure returns to step ST1 to load the next structural information ZC. If the loading has been completed, generation of interleave information ZD is ended.

Referring back to FIG. 8, the generation of the interleave information ZD will be described more in detail.

When the structural information of VOB-A is first loaded, the procedure proceeds from step ST2 to step ST3 of FIG. 7 since it contains only 1 VOB. In step ST3, information for disposing the multiplex bit stream VOB-A in contiguous with the preceding multiplex bit stream is generated. The procedure goes to step ST8 where the information is added to the interleave information ZD.

When the loaded structural information is "{VOB-B, VOB-C, VOB-D}" as shown in FIG. 6, the procedure proceeds from step ST2 to step ST4, since there are multiple VOBs involved. The bit streams are processed in the reverse direction relative to a flow direction of the bit streams. That is, the processing is started with the final pack of the final VOBU of the VOB-D that is finally ordered.

The first ILVU setting procedure for one VOB is executed for the VOB-D. At this stage, minimum size of ILVU Ms is calculated and VOBU pointer position Pu is shifted backward from the VOBU-D1 until the number of cumulative packs Cp reaches this minimum size of ILVU Ms, as shown in FIG. 8C. As the number of cumulative packs Cp becomes equal to the minimum size of ILVU Ms in the "VOBU-D2", a determination is made whether a revision of ILVU setting is necessary or not in the ILVU defining procedure of step ST23 shown in FIG. 10.

Since the necessary number of VOBUs is set to the initial value in the first ILVU setting procedure for one VOB, number of cumulative VOBUs Cv is reset to the necessary number of VOBUs. The procedure then proceeds from step ST23 to step ST24. In step ST24, assume that the starting address AS [D, 1] of ILVU-DR1 to be first set in the "VOB-D" and the ending address AE [D, 1] thereof are set to 0 and 9, respectively. The procedure then proceeds to step ST25.

In step ST25, the ILVU setting procedure has not been completed for "VOB-B" and "VOB-C", so that the procedure returns to step ST22 to repeat the ILVU setting procedure for the next "VOB-C".

ILVU setting procedure similar to the above procedure for "VOB-D" is done for "VOB-C". If the number of cumulative VOBUs Cv exceeds the necessary number of VOBUs, a determination is made that revision of ILVU setting is necessary in the ILVU defining procedure of step ST23. In this case, the ILVU setting procedure is repeated again from the beginning, stating with "VOB-D" after setting the number of cumulative VOBUs Cv to the necessary number of VOBUs and aborting the existing setting.

Now that the necessary VOBU number Nv has been altered, VOBU pointer position Pu for the "VOB-D" is shifted from "VOBU-D2" to "VOBU-D3", for example, as shown in FIG. 8C. Thus, the ending address AE [D, 1] of the first ILVU-DR1 for the "VOB-D" is changed from 9 to 14.

Subsequently, the ILVU setting procedure is executed again for "VOB-C". If it is determined that the number of cumulative VOBUs Cv is not larger than the necessary VOBU number Nv in step ST23 and hence the revision of the ILVU setting is not necessary, the starting address AS [C, 1] and the ending address AE [C, 1] of the first ILVU-CR1 are set to, for example, 15 and 34, respectively. Then further ILVU setting procedure is executed for "VOB-B".

When the revision of the ILVU setting is not necessary for the ILVU setting for "VOB-B", the starting address AS [B, 1] and the ending address AE [B, 1] of the first ILVU-BR1 are set to, for example, 35 and 52, respectively.

The set interleave-processing segment, ILVU for each VOB is then defined. The procedure proceeds to step ST15 where jump distance JW in calculated. Since AD [D, 1] of the first ILVU-DR1 for "VOB-D" is 0, the jump distance JW-DR1 for "VOB-D" is 0, as shown in FIG. 8D. The jump distance JW-CR1 for "VOB-C" is 15 packs (JW-CR1=15 packs) since the starting address AS [C, 1] is 15. The jump distance JW-BR1 for "VOB-B" is 35 packs (JW-BR1=35 packs) since the starting address AS [B, 1] thereof is 35.

Next, after the ILVU defining procedure, the jump distance JW-DR2 can be calculated using the following values.

When the starting address AS [D, 2] (=53) and the ending address AE [D, 2] (=66) for the second ILVU-DR2 in the "VOB-D" are set, the ending address AE [D, 1] (=14) for last ILVU-DR1 in the same VOB (VOB-D) and the starting address AS [D, 2] (=53) for the second ILVU-DR2 are used. In other words, the jump distance JW-DR2 (=38) is obtained by subtracting the ending address AE [D, 1] (=14) for the first ILVU-DR1 from the starting address AS [D, 2] (=53) for the ILVU-DR2, and further subtracting 1 from this result. Similarly, based on the fact that the starting address AS [C, 2] (=67) for the second ILVU (i.e. ILVU-CR2) in "VOB-C", the jump distance JW-CR2 is obtained to be "32 packs" by subtracting, from the starting address AS [C, 2] (=67) for the second ILVU-CR2, the ending address AE [C, 1] (=34) for last ILVU-CR1 in the same VOB-C and 1.

Repeating this processing, each interleave-processing segment, ILVU can be defined for each VOB, and jump distances JW between them can be calculated. For VOBUs in the beginning side of each VOB, the exceptional processing shown in FIG. 10 is executed to them, wherein residual VOBUs are distributed among/to the defined ILVU(s), as described earlier.

Thus, the first interleave-processing segments, ILVUs, ILVU-Rk, for the respective VOBs are defined. Accordingly, jump distances JW-Rk are also calculated. Additionally, the jump distances JW-CR(k+1) and JW-DR(k+1) can be also calculated based on the values of the ending address AE [B, k] for the ILVU-BRk in "VOB-B", the ending address AE [C, k] for the ILVU-CRk in "VOB-C", and the ending address AE [D, k] for the ILVU-DRk in "VOB-D".

Thus, after the interleave-processing segments, ILVUs and jump distances JW are defined, sets of the segments, ILVUs, namely, ILVU-SET-R1-ILVU-SET-Rk are arranged in sequence with them being ordered in the flow direction of bit stream direction as being ILVU-SET-1-ILVU-SET-k. The information for generating a bit stream BS utilizing the respective VOB signals according to the interleave-processing segments, ILVUs based on the arranged results is added to interleave information ZD.

FIG. 13 illustrates such interleave information ZD. The interleave information ZD comprises sector information of a DVD, VOBs and, pack numbers. By performing the above interleave processing and adding the resultant VOBs along with the pack numbers of the data, next to the scene A, a repeating sequence of VOB-B, VOB-C, and VOB-D is added together with their pack numbers. After k ILVUs added, a VOB-E of the next scene E is added.

Assuming now that the pack numbers are as shown in FIG. 13, a signal of VOB-A for the scene A that amounts to 1000 packs is generated as the signal associated with the sector 0 by the multiplexing unit 33-A in the form of a multiplexed bit stream, which is outputted as bit stream BS.

Next, a signal of VOB-B for scene B that amounts to 10 packs is generated as the signal associated with sector 1000 by the multiplexing unit 33 for the scene B in the form of a multiplexed bit stream, which is outputted as the bit stream BS. A signal of VOB-C for scene C that amounts to 10 packs is also generated as the signal associated with sector 1010 by the multiplexing unit 33 for the scene C in the form of a multiplexed bit stream, which is outputted as the bit stream BS.

Further, interleaved bit stream BS is generated based on the structural information ZC by generating a multiplexed bit stream by the multiplexing units 33 implemented for the respective scenes based on the interleave information ZD.

Next, the second interleave processing for seamless reproduction of by selection of any scene using the scenes having different reproduction times, for example, a multiple scenes that belong to different stories will be described.

In the second interleaving procedure, the same number of the interleave-processing segments, for example, ILVUs in bit streams are provided for the respective VOBs. Further, the number of VOBUs in ILVU are regulated depending on the number of packs in respective VOBs since reproduction time can differ for the scenes. When the same number of ILVUs is used for the respective VOBs, it is likely that a VOB having less VOBUs encounters a collapse of reproduced image at the time of jump as compared with a VOB having many VOBUs. To prevent this, the VOB that has fewest VOBUs is set as a base VOBy and a temporary ILVU is previously set for that VOB. Then, based on this temporary ILVU, ILVUs for the rest of the VOBs are set in sequence. If it is confirmed that these set ILVUs do not present any problem for reproduction of data, these set ILVUs are defined as the defined ILVUs for each VOB.

Figure 14:
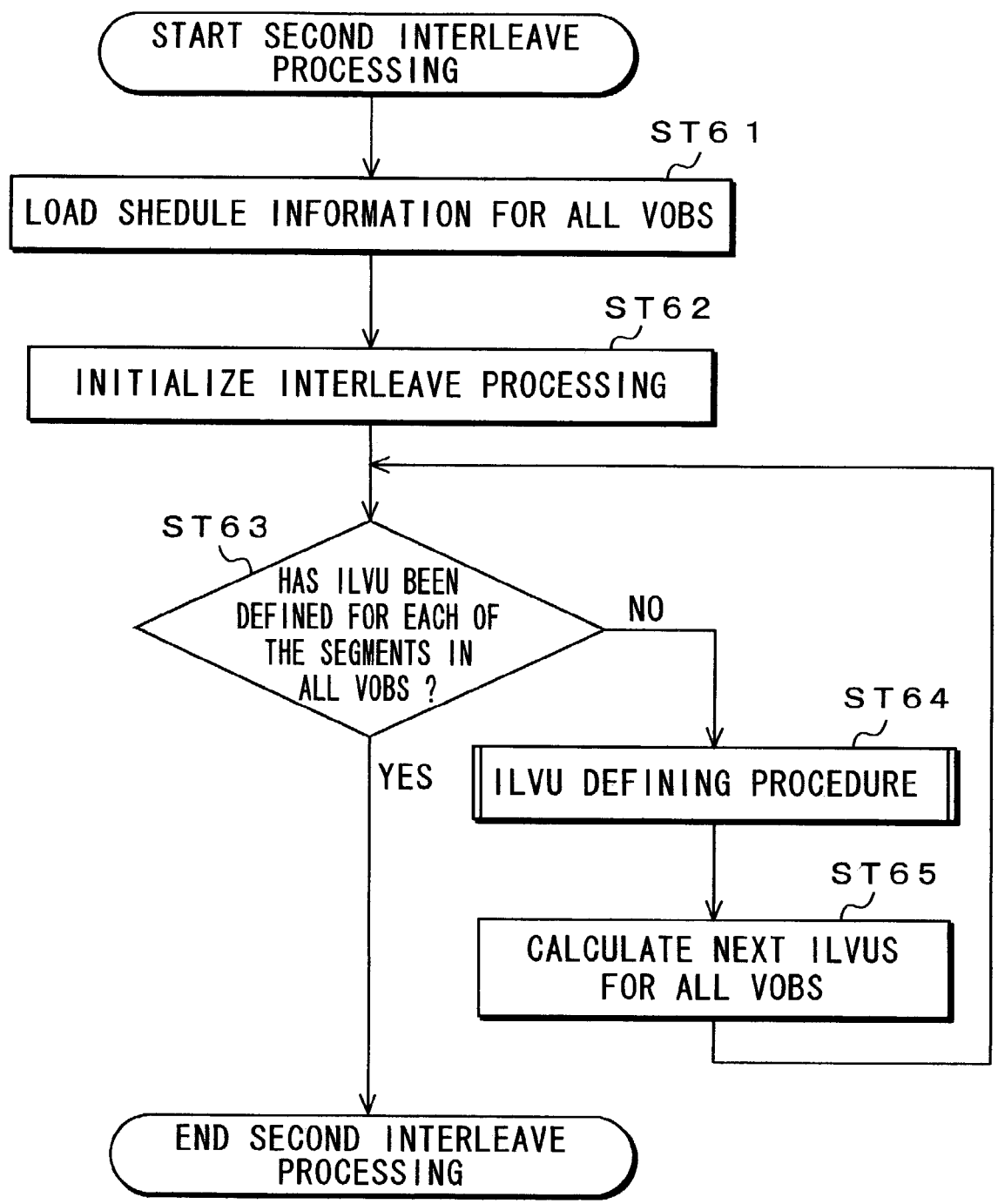
FIG. 14 is a flowchart showing second interleave processing.

FIG. 14 is a flowchart of the second interleave processing. In step ST61, as in the previous step ST11, schedule information is loaded for all the VOBs composing the interleave block.

In step ST62, initialization is made for the interleave processing. In this initialization, VOBU pointers are set to the final VOBUs of respective VOBs. The base VOBy is set to VOB having the shortest reproduction time, i.e. having the fewest VOBUs.

Incidentally, if there are more than one VOBs having the fewest VOBUs, the base VOBy is set to the one having the least data, or packs. In addition, the initial value of address AD is set to 0 in the initialization.

In step ST63, a determination is made whether ILVU has been defined for each of the segments, ILVUs in all the VOBs. If not defined, the procedure proceeds to step ST64 where the ILVUs are defined (ILVU defining procedure).

Figure 15:
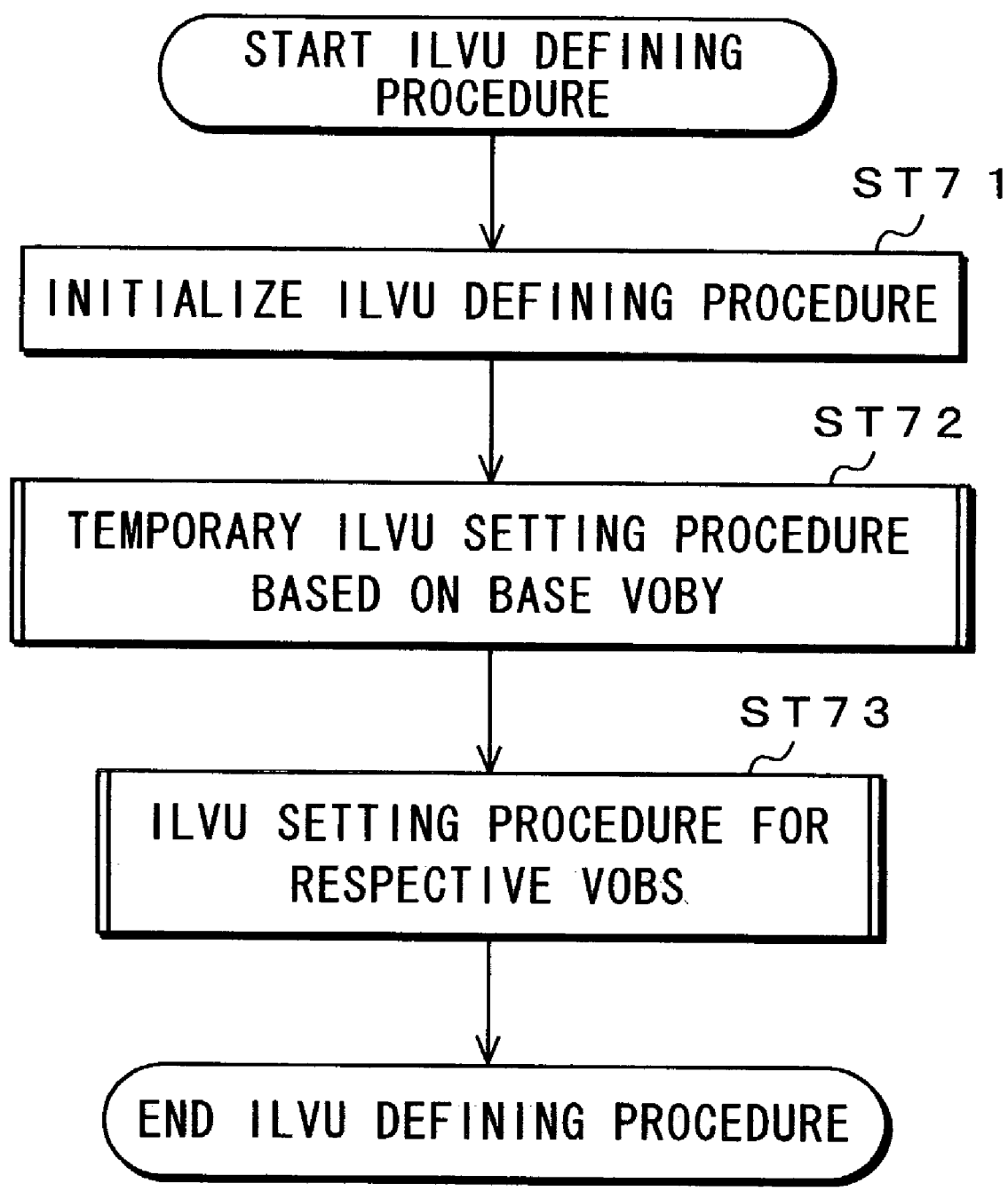
FIG. 15 is a flowchart to define ILVUs.

FIG. 15 is a flowchart of ILVU defining procedure in the second interleave processing. In step ST71, as in step ST21, initialization is made for the ILVU defining procedure, setting initial necessary VOBU number Nv used in the ILVU defining procedure to 0.

In step ST72, temporary ILVU setting procedure is executed on the basis of the base VOBy.

Figure 16:
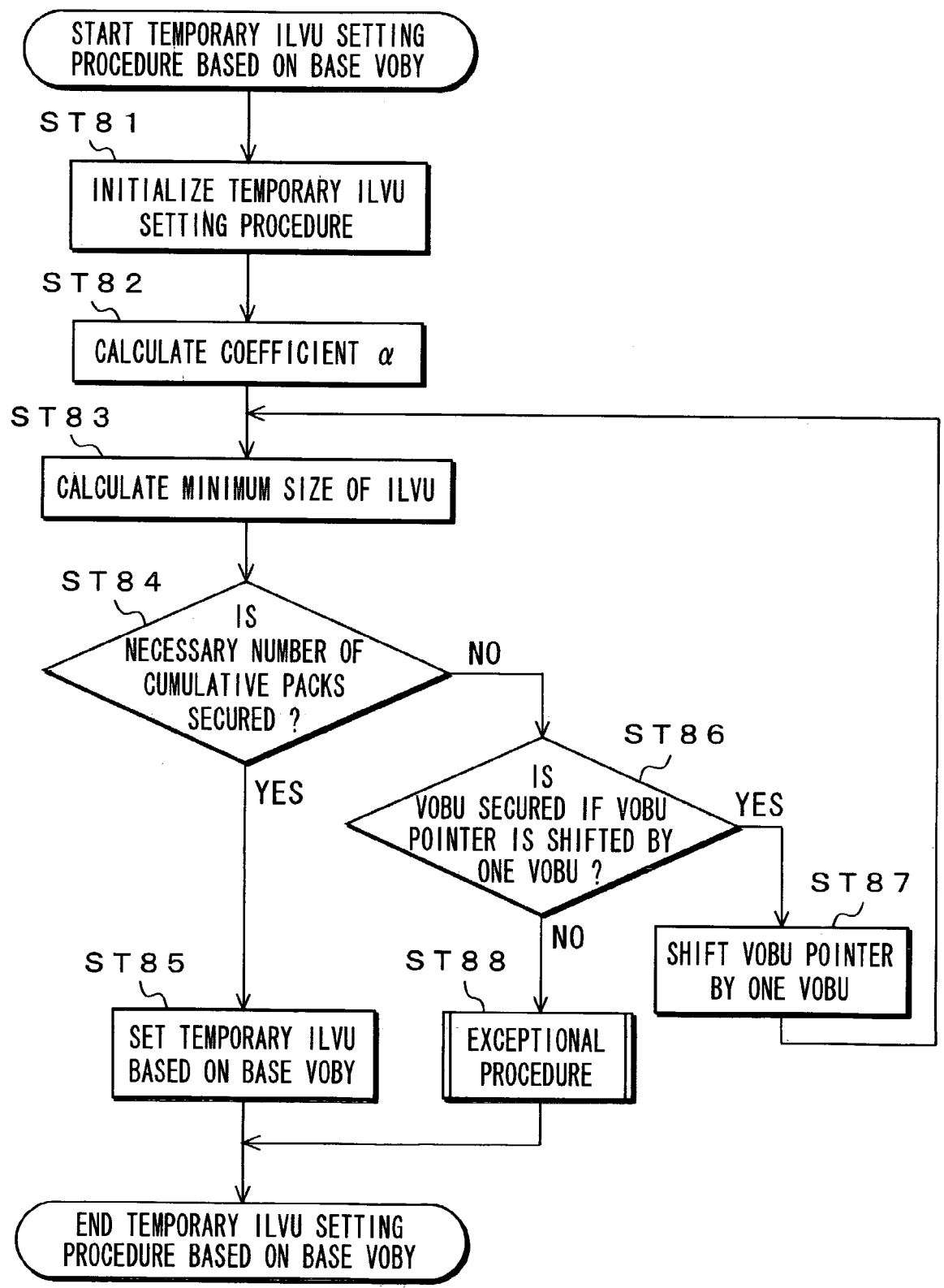
FIG. 16 is a flowchart of a procedure for temporarily setting an ILVU of a base VOBy.

FIG. 16 is a flowchart of the temporary ILVU setting procedure based on the base VOBy. In step ST81, initialization is made for the temporary ILVU setting procedure. In this initialization, number of cumulative packs Cp-y relating to the base VOBy, data transfer time RTs-y, and cumulative VOBU number Cv-y are set to their initial values. Then, the procedure proceeds to step ST82. For example, number of cumulative packs Cp-y, number of cumulative VOBU Cv-y, and data transfer time RTs-y are set to 0, respectively.

In step ST82, a coefficient α for calculating the distance from the position designated by the address AD to the ILVU of the base VOBy is calculated.

The distance from the position designated by the address AD to the ILVU of the base VOBy is defined by the number of packs in the ILVUs of the VOB, placed after the base VOBy. As noted above, base VOBy and other VOBs have different length in time. Furthermore, in order to carry out seamless reproduction properly, the number of ILVUs in each VOB must be the same. Hence, when an temporary ILVU is set relative to the base VOBy, coefficient α is calculated using following Equation (5). Here, α is the coefficient for calculating the number of packs in the ILVU of a VOB other than base VOBy from the number of packs in the temporary ILVU relative to the base VOBy, in accordance with the proportion of numbers of the packs of the respective VOBs.

$$\alpha = \text{(Total number of remaining packs of VOB subsequent to the base VOBy)/(Number of remaining packs of the base VOBy)} \quad (5)$$

In step ST83, a minimum size of ILVU Ms is calculated. In the calculation of the minimum size of ILVU Ms, the current number of packs in VOBU in the base VOBy is added to the number of cumulative packs Cp-y, and the cumulative VOBUs Cv-y is incremented by 1. Data transfer time RTs-y is set equal to data transfer time RTs of the base VOBy.

Next, predicted address ADp is calculated by Equation (6).

$$ADp = AD + \alpha \times Cp\text{-}y \quad (6)$$

As seen from following Equation (7), jump distance JY can be calculated by subtracting the ending address AEU of the ILVU that precedes the ILVU of the base VOBy by one ILVU from the predicted address ADp. It is noted that since the ILVU defined first has no such preceding ILVU, the ending address AEU is set to 0.

$$JY = ADp - AEU \quad (7)$$

A necessary jumping time Tjp-y corresponding to the jump distance JY is calculated by Equation (3). In addition, the minimum size of ILVU Ms-y is calculated by substituting the necessary jumping time Tjp-y thus obtained and data transfer time RT-y of base VOBy into Equation (1).

In step ST84, a decision is made as to whether the number of cumulative packs Cp-y exceeds the number of packs in the minimum size of ILVU Ms-y to secure necessary packs for one temporary ILVU. If the number of cumulative packs Cp-y is less than the minimum size of ILVU Ms-y, the procedure proceeds to step ST86. If the number of cumulative packs Cp-y has reached the minimum size of ILVU Ms-y, the procedure proceeds to step ST85.

In step ST86, a determination is made as to whether VOBU pointer position Pu-y of the base VOBy can be shifted by 1 VOBU to last VOBU. If the VOBU pointer position Pu-y can be shifted by 1 VOBU, the procedure proceeds to step ST87. If VOBU pointer position Pu-y is shifted backward in turn to reach a beginning of the base VOBy so that it cannot be decremented any more, the procedure moves to step ST88.

In step ST87, VOBU pointer position Pu-y is shifted. In this shift, VOBU pointer position Pu-y is shifted backward by 1 VOBU and the number of cumulative VOBU Cv-y is incremented by 1. Subsequently, the procedure returns to step ST83 where the number of packs to the new VOBU pointer position Pu-y is calculated.

If it is determined in step ST84 that the number of cumulative packs Cp-y has reached the minimum size of ILVU Ms-y, the procedure proceeds to step ST85 where the VOBU to which packs are added in the temporary ILVU setting procedure is set as a temporary ILVU. The temporary ILVU setting procedure based on the base VOBy is then ended.

Upon ending the temporary ILVU setting procedure based on the base VOBy, the procedure proceeds to step ST73 where ILVU setting procedure for respective VOBs based on the result of the temporary ILVU setting procedure for the base VOBy is started.

Figure 17:
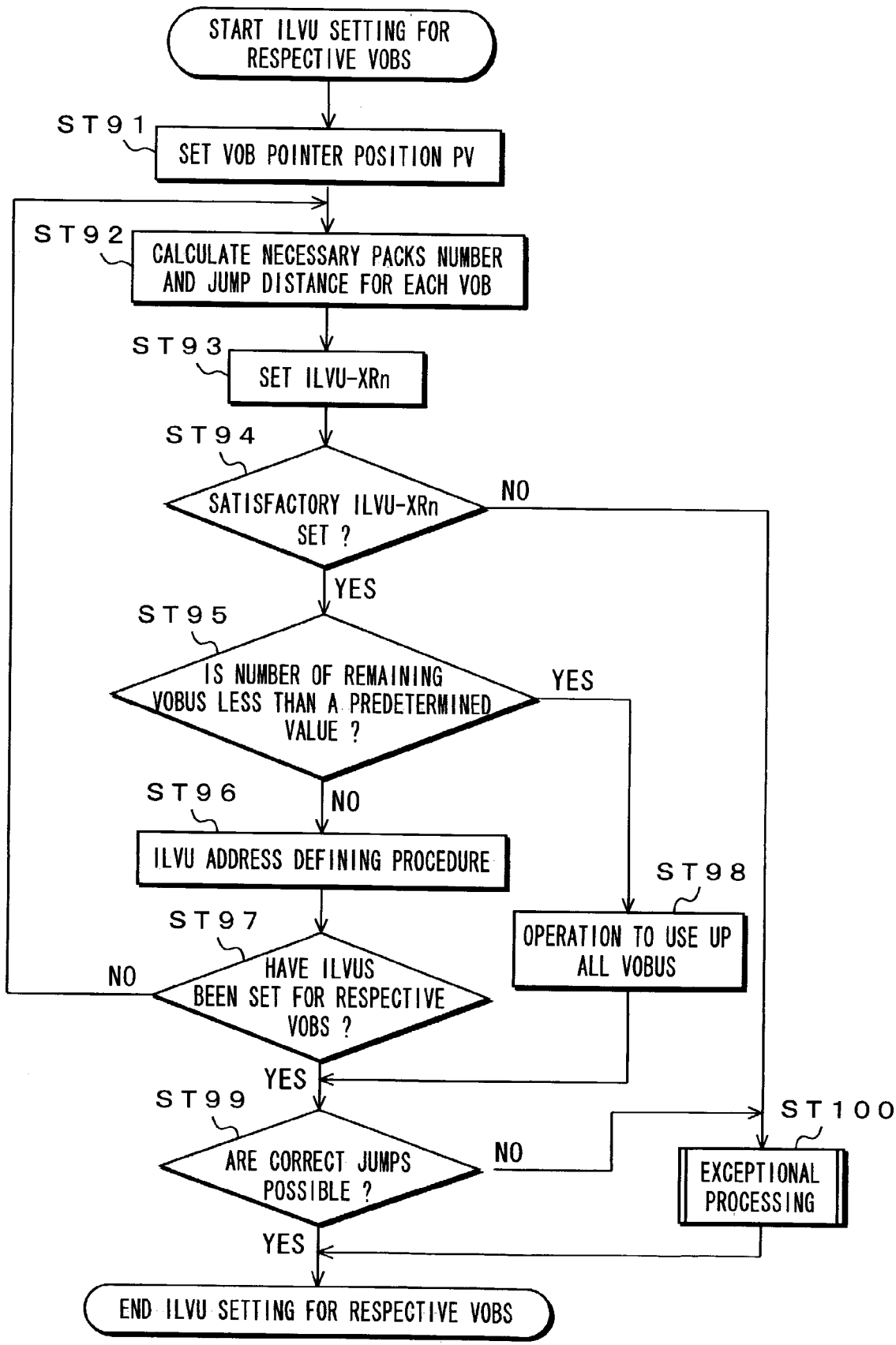
FIG. 17 is a flowchart of a procedure for setting an ILVU of each VOB.

FIG. 17 is a flowchart of ILVU setting procedure for the respective VOBs.

In step ST91, VOB pointer position Pv is set to the VOB which is finally ordered. The procedure then proceeds to step ST92 where the necessary packs number Cq and the jump distance JZ is calculated for each VOB. The necessary packs number Cq is calculated using following Equation (8). The jump distance JZ is calculated using following Equation (9).

$$Cq = \text{(Remaining packs for the current VOB)/(Remaining packs for base VOBy)} \times Cp\text{-}y \quad (8)$$

where the remaining packs for the current VOB and the remaining packs for base VOBy refer to the values relative to remaining packs number before ILVUs are set and defined for the respective VOBs.

$$JZ = \text{Address } AD - (ILVU \text{ address for the current } VOB) \quad (9)$$

In step ST93, ILVU-XRn is set in succession until VOBUs are secured by attaining the necessary packs number Cq and the jump distance JZ, respectively, calculated in step ST92. The procedure then proceeds to step ST94.

In step ST94, when it is determined that a satisfactory VOBU has been attained to set up ILVU-XRn, the procedure proceeds to step ST95. If it is found that ILVU-XRn cannot be set yet, the procedure proceeds to step ST100.

In step ST95, it is determined whether the number of remaining VOBUs is less than a predetermined value. If the number of the remaining VOBUs is less than the predetermined value, the procedure proceeds to step ST96, but otherwise proceeds to step ST98.

In step ST96, address defining procedure is executed. In the procedure, starting address AS and ending address AE of VOB to which VOB pointer position Pv has been set are set, and the number of packs secured for the VOBU are added to the address AD, thereby obtaining new address AD.

In step ST97, it is determined ILVUs have been set for the respective VOBs. If not, VOB pointer position Pv is shifted to the next VOB, and then the procedure returns to step ST92. The procedure proceeds to step ST99 if ILVU-XRn has been successfully set to each of the VOBs, In step ST98, if the number of VOBUs becomes less than a predetermined value in one or more of the VOBs, an operation is performed to use up all of the current VOBUs to thereby making the current setting of ILVU-XRn final. This is because the numbers of ILVUs for each VOB are the same. The procedure proceeds to step ST99.

According to the procedure as described above, one ILVU can be set for respective VOBs. In step ST99, it is confirmed if correct jumps are allowed when such the ILVU are set for the respective VOBs. If the confirmation is made that the jumps can be carried out, in other words, a confirmation is made that images can be reproduced without a break when data is acquired from the next ILVU by a jump, the procedure for setting ILVU for the respective VOBs is ended. The set ILVUs are defined to be ILVUs for respective VOBs, which comprise one set of ILVUs. The ILVU defining procedure shown in FIG. 15 is ended. The procedure then proceeds to step ST65 shown in FIG. 14. On the other hand, if it is not confirmed that jumps can be done successfully, the procedure proceeds to step ST100.

When moved from step ST94 or step ST99 to step ST100 where the exceptional processing as described in connection with FIG. 11 is executed. The procedure then proceeds to step ST65 when the exceptional processing does not encounter abnormal termination.

In step ST65, the number of the VOBUs and the number of packs that remains after the ILVU defining procedure in step ST64 are evaluated to set a base VOBy again. The procedure then proceeds to step ST63.

Steps ST64 and ST65 are repeated. This repeat allows, the size of ILVU to be determined in accordance with the number of remaining packs of respective VOBs. Each of the VOBs is interleaved under the same number of ILVUs.

After the completion of the second interleave processing, the procedure proceeds to step ST7 of FIG. 7 where ILVUs are arranged in the flow direction of bit streams as in the first interleave processing since, in the second interleave processing in step ST6, the ILVUs have been also defined in the backward direction. Then the procedure proceeds to step ST8.

In step ST8, information needed to generate a bit stream BS is generated using VOB signals for each interleave-processing segment, ILVU based on the arranged results in step ST7. The information is added to interleave information ZD. The procedure then proceeds to step ST9.

In step ST9, a determination is made as to whether loading of structural information ZC has been finished. If not, the procedure goes back to step ST1 to load the next structural information ZC. If the loading has been finished, steps of regenerating interleave information ZD is ended.

In this way, a base VOBy is set for the VOB whose undefined portion of ILVU has the shortest reproduction time, or for the VOB having the least data if there are more than one VOBs having the shortest remainder, at the time of starting interleaving procedure or each time ILVUs are defined. A temporary ILVU is set for the base VOBy. Then, ILVUs are set in sequence for the respective VOBs in the reverse direction with respect to the flow direction of bit streams based on the result of setting the temporary ILVU. In other words, based on the temporary results, the sizes of ILVUs are set in accordance with the reproduction time of the scene. The ILVUs of VOBs other than the base VOBy are also set in sequence in the reverse direction with respect to the flow direction of bit streams based on the interleave-processing segments that are subsequently set. As a consequence, interleave information ZD can be generated to render correct interleave processing for multiple VOBs if they have different reproduction times.

FIG. 18 illustrates generation of interleave information ZD for seamless reproduction by selection of any scene using multiple scenes having different reproduction times. FIGS. 18A through 18C show VOB-B, VOB-C, and VOB-D. FIG. 18D shows a structure of data formed when a base VOBy is assumed for setting a temporary ILVU for the respective VOBs. FIG. 18E is a structure of data formed after the ILVU defining procedure is finished.

Suppose now that the loaded information is "{VOB-B, VOB-C, and VOB-D}" as shown in FIG. 6, and it has been determined in step ST62 that VOB-C has the smallest number of VOBUs. In this case, base VOBy is set to be VOB-C and a temporary ILVU setting procedure is executed in step ST72.

In this temporary ILVU setting procedure, coefficient $\alpha$ is calculated in step ST82. Suppose further that the total number of packs of VOB-C (which is also the base VOBy) is 100 packs, and the total number of packs in VOB-D following VOB-C is 400 packs. Then, from Equation (5), coefficient $\alpha$ turns out to be 400/100=4.

Assuming that the position of VOBU pointer position Pu is shifted into VOBU-C2 while repeating the steps ST83-ST87, a temporary ILVU is set in step ST85 when the number of cumulative packs Cp-y has reached the minimum size of ILVU Ms-y in step ST84. In this example, if the number of cumulative packs Cp-y is 10 packs, the predicted address ADp is 0+4×10=40. Hence, ILVU-yR1 is temporarily set for VOB-C, as shown in FIG. 18D.

Next, after ILVU setting procedure executed for the respective VOBs in step ST73, VOB pointer position Pv is set to the final VOB, VOB-D, in step ST91. A necessary number of packs Cq is calculated in step ST92. Using Equation (8), the necessary number of packs Cq is calculated as (400/100)× 10=40.

Note that the address AD is initially set to 0 and that ILVU address of VOB-D is 0 since this is the ILVU setting procedure for the first VOB in the first ILVU-SET-R1. Hence, Jump distance JZ-DR1 is 0−0=0.

Subsequently, when VOBU pointer position Pu is shifted to VOBU-D6, the procedure proceeds from step ST94 to step ST95 when the necessary number of packs Cq and the jump distance JZ are attained. However, if the number of the remaining VOBUs is less than a predetermined value, the procedure proceeds to step ST96 where ILVU address defining procedure is executed so that ILVU address is determined. In ILVU address defining procedure, the starting address AS of [D, 1] (=0) and the ending address AE (=39) of the first ILVU, ILVU-DR1, are set for VOB-D, and the number of packs secured in VOBU is address AD, thereby obtaining new address AD. In the example shown herein, adding the number of packs, "40" secured in VOBU to the initial value, "0" of address AD allows the new address AD to be given by 0+40=40.

In this manner, the ILVU-DR1 is set for VOB-D. The procedure then proceeds to step ST97 where it finds out that required processing has not been finished yet for all the VOBs. Thus, VOB pointer position Pv shifts to the next VOB, VOB-C, and the procedure returns to step ST92.

ILVU-CR1 can be set for VOB-C by repeating the steps starting from step ST92. In this instance, Equation (8) gives 10 as the value of necessary number of packs Cq. Since the address AD is presently 40, jump distance JZ-CR1 is calculated as 40−0=40, using Equation (9). Processing is repeated until the necessary number of packs Cq and the jump distance JZ-CR1 are attained by securing VOBUs.

Subsequently, in step ST96, starting address AS [C, 1] (=40) and the ending address AE [C, 1] (=49) of a first ILVU for VOB-C are set. New address AD is obtained by adding to the address AD necessary number of packs Cq. In the example shown herein, the address AD is 40, and the number of cumulative packs Cp is 10, so that the new address AD turns out to be 50. Further in step ST97, since processing for all of the VOBs has not been finished, VOB pointer position Pv is set to the next VOB, VOB-B. The procedure then returns to step ST92.

Assuming that the remaining packs are 200 for VOB-B, the necessary number of packs Cq is calculated using Equation (8) as (200/100)×10=20. Since the address AD is now 50, the jump distance JZ-BR1 is calculated by Equation (9) as 50−0=50. Processing is continued until the necessary number of packs Cq and the jump distance. JZ are attained by securing VOBUs.

After that, in step ST96, the starting address AS [B, 1] (=50) and the ending address AE [B, 1] (=69) of a first ILVU for VOB-B are set, and new address AD (=70) is obtained by adding necessary number of packs Cq (=20) to address AD (=50). In this way, ILVU-BR1 is set for VOB-B.

After completing ILVU setting for the respective VOBs, the procedure proceeds to step ST98 where it is determined whether jump is allowable or not from the transfer time of a respective VOB, the number of packs in ILVU, and he jump distance JZ. If jump is allowable, ILVU-BR1, ILVU-CR1, and ILVU-DR1 of the respective VOBs are defined to be ILVUs comprising ILVU-SET-R1.

Following the determination of ILVU-SET-R1, base VOBy is set up again based on the number of VOBUs and the number of packs after the decision of ILVU-SET-R1. The temporary ILVU setting procedure is again repeated. Now that the numbers of remaining packs are 200−20=180 for VOB-B, 100−10=90 for VOB-C, and 400−40=360 for VOB-D, a temporary ILVU setting procedure is repeated with VOBy being reset to VOB-C.

Since the remaining packs for VOB-C as base VOBy is presently 90 packs and the number of remaining packs for VOB-D is 360 packs, coefficient α is given by Equation (5) as 360/90=4.

If, in step ST84, the necessary number of packs are secured by repeating steps ST83, ST84, ST86, and ST87 with VOBU pointer position Pu being shifted to VOBU-C4, a temporary ILVU, ILVU-yR2, is set in step ST85. Incidentally, if the number of cumulative packs Cp-y2 is 12 packs, predicted address ADp is 70+4×12=118. Jump distance JY-y is given by subtracting from the predicted address ADp (=118) the ending address AEU (=49) of last ILVU defined in the base VOBy, and 1, which equals 118−49−1=68. Thus, as shown in FIG. 18D, a new temporary ILVU-yR2 is set based on the base VOBy.

Next, when ILVU setting procedure for the respective VOBs is executed again in step ST73 and VOB pointer position Pv is set to the final VOB, VOB-D, in step ST91, necessary number of packs Cq is calculated in step ST92 as (360/90)×12=48, using Equation (8).

Since the ending address AE of last ILVU set in VOB-D is 39 and the starting address of current ILVU in VOB-D is 70, jump distance JZ-DR2 turns out to be 70−39−1=30.

Subsequently, when the necessary number of packs Cq and the jump distance JZ-DR2 are attained if the VOBU pointer position Pu shifts to VOBU-D6, the procedure proceeds to step 95 via steps ST93 and ST94. Unless the remaining number of VOBUs is reached to a predetermined value, the procedure further proceeds to step ST96 where the starting address AS [D, 2] (=70) and the ending address AE [D, 2] (=118) of the ILVU-DR2 for VOB-D are set. The number of packs secured in VOBU is added to the address AD, thereby obtaining new address AD. That is, for the address AD=70, the number of packs=48, the new address AD=70+48=118. Further, since the processing has not been finished for all of the VOBs, the procedure returns to step ST92 with VOB pointer position Pv shifting to the next VOB, VOB-C.

Subsequently, procedure is repeated from step ST92 so that ILVU-CR2 for VOB-C can be set. Then, using Equation (8), necessary number of packs Cq is calculated to be 12. Since the address AD is 118, jump distance JZ-CR2 is equal to 118−49−1=68, as calculated by Equation (9). Processing for securing VOBUs is repeated until the necessary number of packs Cq and the jump distance are attained.

Subsequently, in step ST96, the starting address AS [C, 2] (=118) and the ending address AE [C, 2] (=129) of ILVU-CR2 are set for VOB-C, and the number of packs secured in VOBU is added to the address AD, thereby obtaining new address AD. That is, the number of packs Cp (=12) is added to the address AD (=118) to obtain the new address AD=130. Further, since the processing has not been finished for all of the VOBs, the VOB pointer position Pv shifts to the next VOB, VOB-B and the procedure returns to step ST92.

Presently, since the number of the remaining packs for VOB-B is 200−20=180, necessary number of packs Cq is calculated to be (180/90)×12=24, using Equation (8).

Since the address AD is 130, the jump distance JZ-BR2 is calculated as 130−69−1=60, using Equation (9). Subsequently, in step ST96, the starting address AS [B, 2] (=130) and the ending address AE [B, 2] (=153) of ILVU-BR2 are set for VOB-B, and the number of packs secured for VOBU is added to the address AD, thereby obtaining new address AD. That is, the number of packs Cp (=24) is added to the address AD (=130) to obtain the new address AD=154. Now that ILVU setting has been finished for all of the VOBs in ILVU-SET-R2, the procedure proceeds to step ST98 where a determination is made, from the transfer time of respective VOBs, the number of packs in ILVU, and the jump distances JZ whether jumps are allowable or not. If the jump allowable, each ILVU is defined for ILVU-SET-R2. When the similar procedure is repeated until VOBU pointer position reaches the head (or beginning) of each of the VOBs, remaining VOBUs are used up if the VOBU pointer position reaches the head thereof, thereby defining ILVUs in ILVU-SET-Rk. Jump distance JZ-CR(k+1) and jump distance JZ-DR(k+1) can be calculated from ending addresses AE [B, k] of ILVU-BRk for VOB-B, ending addresses AE [C, k] of ILVU-CRk for VOB-C, and ending addresses AE [D, k] of ILVU-DRk for VOB-D.

When ILVU and jump distance JZ are defined, the ILVU-SET-R1-ILVU-SET-Rk which have been sequentially defined in the reverse direction with respect the flow direction of bit streams are arranged in the flow direction of the streams into a sequence of ILVU-SET-1-ILVU-SET-k. Based on this arrangement, information for generating a bit stream BS utilizing the signals of the respective VOBs in the interleave-processing segments, ILVU is added to the interleave information ZD. By controlling the multiplexing unit 33 based on the interleave information ZD thus obtained, a seamlessly reproducible bit stream BS can be generated in DVD-recordable form.

It is noted that the above described interleaving unit 40 can be adapted to be composed of a computer-running program wherein interleave-processing program executes the interleave-processing procedure shown in the flowcharts above. In this instance, the interleave-processing program may be preloaded in the computer.

Alternatively, the interleave-processing program may be stored on a recording medium, so that the program can be retrieved from the recording medium as needed. As a still further alternative, the program may be supplied to the computer using a communications network.

As described above, ILVUs are defined in sequence in the reverse direction relative to a flow direction of the bit streams, which enables jumps between the ILVUs of each scene unambiguous, so that the sizes of ILVUs can be minimized. The minimum size of ILVUs allows the number of VOBs consisting of the interleave block to be increased. This is, many scenes can be reproduced in seamless environment.

By defining ILVUs in sequence in the reverse direction relative to a flow direction of the bit streams, jump distances become unambiguous. Then it is not necessary to assume sizes of ILVUs to define ILVUs in sequence in the flow direction. Therefore, time required for interleaving bit streams can be cut down, as compared with conventional interleave processing in which ILVUs are defined in the flow direction.

Thus has been described an apparatus for carrying out interleave processing. In the invention, structural information describing the structures of multiple bit streams to be interleaved is generated; interleave-processing segments in the bit streams are defined in the backward direction relative to a flow direction of the bit streams; and then the defined interleave-processing segments are arranged in the flow direction of the bit streams, thereby establishing interleave processing.

By deciding the interleave-processing segments, ILVU in sequence in the backward direction relative to a flow direction of the bit streams, jump distances between the interleave-processing segments can be defined unambiguously. Accordingly, interleave-processing segments can be defined in the minimum sizes, thereby cutting down time for interleaving the bit streams.

According to the invention, the interleave-processing segments can be defined each time one interleave-processing segment is set for each of the multiple bit streams and the interleave-processing segments are set with the interleave-processing segment of one bit stream being set following the set interleave-processing segment of other bit stream. It is therefore possible, based on the interleave-processing segments that have been set or defined, to easily determine jump distances between the interleave-processing segments.

The invention provides processing in which, in setting interleave-processing segments in sequence based on the interleave-processing segment that has been already set, an amount of data in the remaining bit stream is distributed among/to the defined interleave-processing segment(s) in the event that the amount of data is less than the final interleave-processing segment. As a consequence, it is possible to define interleave-processing segments that accommodate all the bit streams if the remaining bit stream is too short to form an interleave-processing segment.

According to the invention, at the beginning of interleave processing or for each time the interleave-processing segments are defined, a temporary interleave-processing segment is set. The setting of temporary interleave-processing segment is executed to the bit stream having the shortest reproduction time for undefined portion of the interleave-processing segment or the bit stream having the smallest amount of data when more than one bit streams have the shortest reproduction time.

The interleave-processing segments of the multiple bit streams obtained based on the temporary interleave-processing segment can be set in sequence in the backward direction relative to the flow direction of the bit streams. Accordingly, interleave processing of multiple bit streams can be carried out correctly even when the bit streams have different reproduction times.

While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An apparatus for interleave processing, the apparatus comprising:
    structural information output means for outputting structural information on structures of respective multiple bit streams to be interleaved; and
    interleave-defining means for defining interleave processing by defining interleave-processing segments in said respective multiple bit streams based on said structural information in a backward direction of the bit streams relative to a flow direction thereof and arranging said interleave-processing segments thus defined in the flow direction of said bit streams,
    wherein said interleave-defining means defines said interleave-processing segments each time said interleave-defining means has set one interleave-processing segment for each of said multiple bit streams; and
    wherein said interleave-defining means sets said interleave-processing segments with said interleave-processing segment of one bit stream being set to follow the set interleave- processing segment of other bit stream.

2. The apparatus according to claim 1, wherein when said interleave-processing segment of one bit stream is set to follow the set interleave-processing segment of other bit stream and an amount of data of a rest of said bit stream is not enough for the last interleave-processing segment, said interleave-defining means distributes the rest data of said bit stream to the defined interleave-processing segment.

3. The apparatus according to claim 1,
    wherein at any one of the time for beginning of interleave processing and each time said interleave-processing segments are defined, said interleave-defining means sets temporary interleave-processing segment to bit stream, said bit stream being selected from the bit stream having the shortest reproduction time for undefined portion of the interleave-processing segment and the bit stream having the smallest amount of data when more than one bit streams have the shortest reproduction time; and
    wherein said interleave-defining means sets said interleave-processing segments in said respective multiple bit streams in sequence based on the temporary setting of the interleave-processing segment in a backward direction of the bit streams relative to the flow direction thereof.

4. A method of interleave processing, comprising the steps of:
    generating structural information on structures of respective multiple bit streams to be interleaved;
    defining interleave-processing segments in said respective multiple bit streams based on said structural information in a backward direction of the bit streams relative to a flow direction thereof; and arranging said interleave-processing segments thus defined in the flow direction of said bit streams, thereby defining an interleaving operation to said bit steams, wherein said interleave-processing segments are defined each time one interleave-processing segment has been set for each of said multiple bit streams; and wherein said interleave-processing segments are set with said interleave-processing segment of one bit stream being set to follow the set interleave-processing segment of other bit stream.

5. The method according to claim 4, wherein when said interleave-processing segment of one bit stream is set to follow the set interleave-processing segment of other bit stream and an amount of data of a rest of said bit stream is not enough for the last interleave-processing segment, the rest data of said bit streams is distributed to the defined interleave-processing segment.

6. The method according to claim 4, wherein at any one of the time for beginning of interleave processing and each time said interleave-processing segments are defined, a temporary interleave-processing segment is set to bit stream, said bit stream being selected from the bit stream having the shortest reproduction time for undefined portion of the interleave-processing segment and the bit stream having the smallest amount of data when more than one bit streams have the shortest reproduction time; and wherein said interleave-processing segments in said respective multiple bit streams are set in sequence based on the temporary setting of the interleave-processing segment in a backward direction of the bit streams relative to the flow direction thereof.

7. A computer-readable medium storing a computer program that when executed on a computer causes interleave processing, the program comprising the steps of:

loading structural information on structures of respective multiple bit streams to be interleaved into a computer;

defining interleave-processing segments of said respective multiple bit streams based on said structural information in a backward direction of said bit streams relative to a flow direction thereof; and arranging said defined interleave-processing segments in the flow direction of said bit streams, wherein said interleave-processing segments are defined each time one interleave-processing segment has been set for each of said multiple bit streams; and wherein said interleave-processing segments are set with said interleave-processing segment of one bit stream being set to follow the set interleave-processing segment of other bit stream.

8. The program according to claim 7, wherein when said interleave-processing segment of one bit stream is set to follow the set interleave-processing segment of other bit stream and an amount of data of a rest of said bit stream is not enough for the last interleave-processing segment, the rest data of said bit stream is distributed to the defined interleave-processing segment.

9. The program according to claim 7, wherein at any one of the time for beginning of interleave processing and each time said interleave-processing segments are defined, a temporary interleave-processing segment is set to bit stream, said bit stream being selected from the bit stream having the shortest reproduction time for undefined portion of the interleave-processing segment and the bit stream having the smallest amount of data when more than one bit streams have the shortest reproduction time; and wherein said interleave-processing segments in said respective multiple bit streams are set in sequence based on the temporary setting of the interleave-processing segment in a backward direction of the bit streams relative to the flow direction thereof.

\* \* \* \* \*